United States Patent
Chen et al.

(10) Patent No.: US 9,772,503 B2
(45) Date of Patent: Sep. 26, 2017

(54) AUTOSTEREOSCOPIC DISPLAY DEVICE AND METHOD

(71) Applicant: SuperD Co. Ltd., Shenzhen (CN)

(72) Inventors: Yinwei Chen, Shenzhen (CN); Xiaoda Gong, Shenzhen (CN); Lei Song, Shenzhen (CN); Ning Liu, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 112 days.

(21) Appl. No.: 13/952,799

(22) Filed: Jul. 29, 2013

(65) Prior Publication Data

US 2014/0028933 A1    Jan. 30, 2014

(30) Foreign Application Priority Data

Jul. 27, 2012  (CN) .......................... 2012 1 0264172

(51) Int. Cl.

| G02B 27/22 | (2006.01) |
|---|---|
| H04N 13/04 | (2006.01) |
| G02F 1/1347 | (2006.01) |
| G02B 27/26 | (2006.01) |
| G02F 1/1335 | (2006.01) |

(52) U.S. Cl.
CPC .......... *G02B 27/26* (2013.01); *G02B 27/225* (2013.01); *G02F 1/1347* (2013.01); *H04N 13/0404* (2013.01); *H04N 13/0413* (2013.01); *G02B 27/22* (2013.01); *G02F 1/133526* (2013.01)

(58) Field of Classification Search
CPC .. G02B 27/2214; G02B 27/26; G02B 27/225; G02F 1/1347; G02F 1/133526; H04N 13/0413; H04N 13/0404
See application file for complete search history.

(56) References Cited

U.S. PATENT DOCUMENTS

| 9,052,516 | B2* | 6/2015 | Xie et al. | |
|---|---|---|---|---|
| 2003/0039031 | A1* | 2/2003 | Redert | G02B 27/2214 359/463 |
| 2007/0035672 | A1* | 2/2007 | Shestak | G02B 27/2214 349/15 |
| 2008/0316380 | A1* | 12/2008 | Ijzerman et al. | 349/15 |

(Continued)

FOREIGN PATENT DOCUMENTS

| CN | 1908734 A | 2/2007 |
|---|---|---|
| CN | 201156112 Y | 11/2008 |

(Continued)

*Primary Examiner* — Jessica M Merlin
(74) *Attorney, Agent, or Firm* — Anova Law Group, PLLC

(57) ABSTRACT

A three-dimensional (3D) display system is provided. The 3D display system includes a backlight plate, a display panel, a light-splitting device, and a polarization state controller. The display panel is configured to display a two-dimensional (2D) image in a 2D mode or to display a 3D image in a 3D mode. The light-splitting device is configured to an arrangement module configured to pass the 2D image in the 2D mode, and to separate the 3D image into a left image and a right image. Further, the polarization state controller is disposed between the display panel and the light-splitting device and is configured to rotate a polarization direction of light emitted from the display panel in the 2D mode, and to keep the polarization direction of the light emitted from the display panel in the 3D mode.

12 Claims, 15 Drawing Sheets

(56) References Cited

U.S. PATENT DOCUMENTS

| | | | |
|---|---|---|---|
| 2010/0097449 A1* | 4/2010 | Jeong | G02B 27/2214 348/59 |
| 2012/0007853 A1* | 1/2012 | Lv | 345/419 |
| 2012/0075540 A1* | 3/2012 | Chen et al. | 349/15 |
| 2012/0099034 A1* | 4/2012 | Pijlman et al. | 349/15 |
| 2012/0194510 A1* | 8/2012 | Yun | G02B 3/06 345/419 |
| 2014/0362313 A1* | 12/2014 | Xie et al. | 349/15 |
| 2014/0375706 A1* | 12/2014 | Lee et al. | 345/697 |

FOREIGN PATENT DOCUMENTS

| | | |
|---|---|---|
| CN | 101900887 A | 12/2010 |
| CN | 102364391 A | 2/2012 |
| CN | 102436101 A | 5/2012 |
| JP | H09203980 A | 8/1997 |
| TW | 201213867 A | 4/2012 |

* cited by examiner

AUTOSTEREOSCOPIC DISPLAY DEVICE AND METHOD

CROSS-REFERENCES TO RELATED APPLICATIONS

This application claims the priority of Chinese patent application number 201210264172.0, filed on Jul. 27, 2012, the entire contents of which are incorporated herein by reference.

FIELD OF THE INVENTION

The present disclosure generally relates to the display technologies and, more particularly, to full resolution autostereoscopic display devices.

BACKGROUND

In three-dimensional (3D) display technology, the principle of binocular parallax is used to allow users to have close-to-the-real-world 3D experience. Currently, the 3D display technologies are divided into two categories, glasses-type 3D display and autostereoscopic (naked-eye) 3D display. Generally speaking, naked-eye stereoscopic or autostereoscopic 3D display devices are easy to use, and are in line with human eyes' daily viewing habits, etc. However, autostereoscopic display devices have their own inherently flaws.

Currently, the autostereoscopic display implementations generally include parallax slit grating, micro-cylindrical lens array, and directional backlight, etc. However, these methods are based on the spatial segmentation to display a 3D image, which may cause the display resolution degradation problem, affecting 3D display effects. Thus, full display resolution devices have been developed.

As shown in FIG. 1, an existing full resolution 3D display device includes: a parallax barrier 115 arranged between a backlight plate 110 and a display panel 120 for separating view images; a polarizer 125 for polarizing the light outputted by the display panel 120 to produce first polarized light; a polarization switch 130 for converting the first polarized light to second polarized light; and a birefringent plate 135 which changes the refractive index based on the polarization state of the incident light.

In operation, the parallax barrier 115 separates an original image emitted from the display panel 120 into a left eye image and a right eye image, and the separated left and right eye images are odd columns or even columns images of the original image. Then, using other device and time-division-multiplexing to combine single images of the odd columns and even columns to form the full resolution images. Using the left eye image as an example, at the first time point, the parallax barrier 115 separates the odd column image of the original image, and the light passes through the polarizer 125 and is then transmitted as the first polarized light. Then, the first polarized light passes the birefringent plate 135 with a first refractive index and reaches the left eye (LE) location.

At the second time point, the parallax barrier 115 separates the even column image of the original image, and the light passes through the polarizer 125 and is then transmitted as the second polarized light. Then, the second polarized light passes the birefringent plate 135 with a second refractive index and reaches the left eye (LE) location. By controlling the first and second time points such that the total time is less than 30 ms, lower than the reaction time of human eyes, the odd columns and even columns of the left eye image can be combined into a complete full resolution image. The polarization switch controller 133 and the display device controller 123 are synchronized.

However, the time-division-multiplexing approach may cause certain issues. For example, because the parallax barrier 115 is arranged between the backlight plate 110 and the display panel 120, efficiency of the backlight may decrease, causing reduction in brightness of the display panel. Further, using the birefringent plate to shift light to combine the odd column image and the even column image may cause difference in emission angle of the light emitting from the display, resulting in spatial overlapping between the odd column image and the even column image and crosstalk.

The disclosed device and method are directed to solve one or more problems set forth above and other problems.

BRIEF SUMMARY OF THE DISCLOSURE

One aspect of the present disclosure includes a three-dimensional (3D) display system. The 3D display system includes a backlight plate, a display panel, a light-splitting device, and a polarization state controller. The display panel is configured to display a two-dimensional (2D) image in a 2D mode or to display a 3D image in a 3D mode. The light-splitting device is configured to an arrangement module configured to pass the 2D image in the 2D mode, and to separate the 3D image into a left image and a right image. Further, the polarization state controller is disposed between the display panel and the light-splitting device and is configured to rotate a polarization direction of light emitted from the display panel in the 2D mode, and to keep the polarization direction of the light emitted from the display panel in the 3D mode.

Another aspect of the present disclosure includes a 3D display device. The 3D display device includes a display panel, a second polarization state controller coupled to the display panel, and a fourth lens grating coupled to the second polarization state controller. The 3D display device further includes a first polarization state controller coupled to the fourth lens grating and a third lens grating coupled to the first polarization state controller. The third lens grating and the fourth lens grating are combined lenses of a single-refractive-index lens and a double-refractive-index lens; and a curvature radius of the third lens grating is larger than a curvature radius of the fourth lens grating. Further, the single-refractive-index lenses in the third lens grating and the fourth lens grating are offset by half of a lens unit.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings.

Figure 1:
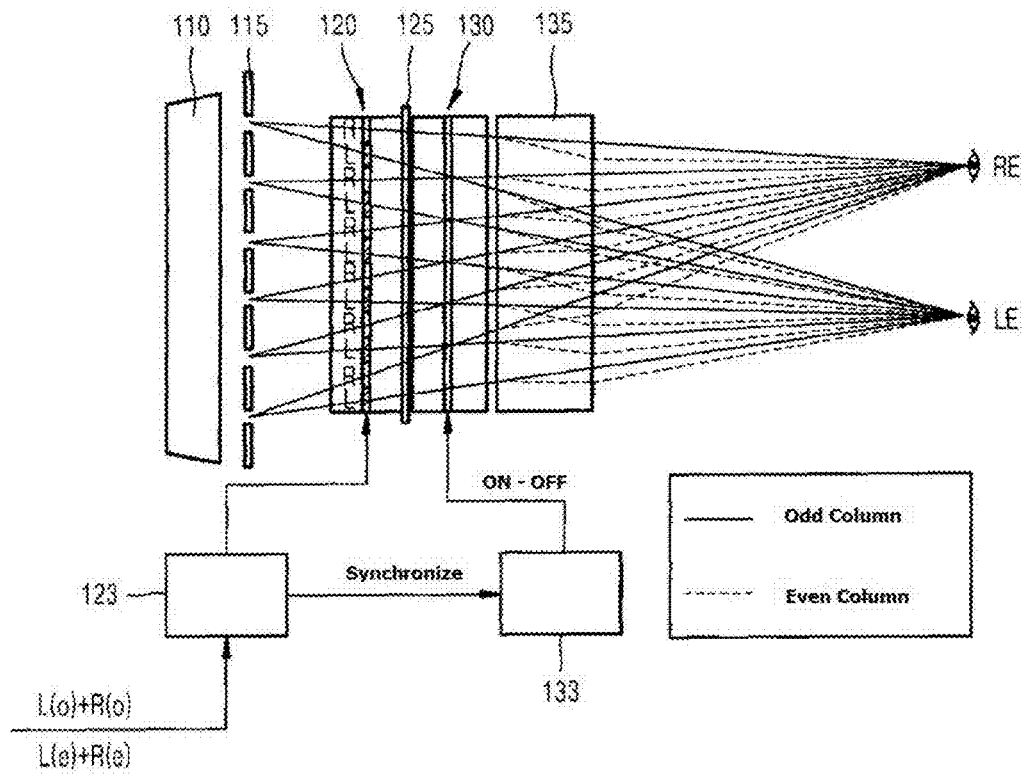
FIG. 1 is an existing full resolution stereoscopic display apparatus.
Figure 2:
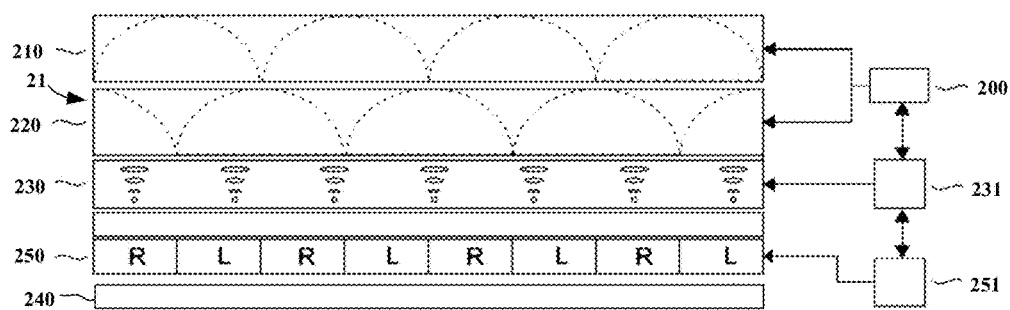
FIG. 2 illustrates an exemplary autostereoscopic display device consistent with the disclosed embodiments.

FIG. 2 illustrates an exemplary autostereoscopic display device. As shown in FIG. 2, the autostereoscopic display device includes a light-splitting device 21, a polarization state controller 230, a display panel 250, a backlight plate 240, a light-splitting device driver 200, a polarization state controller driver 231, a display panel driver 251, and a synchronization controller (not shown). Certain components may be omitted, and other devices may be added.

The light-splitting device driver 200 is configured to drive the light-splitting device 21; the polarization state controller driver 231 is configured to drive the polarization state controller 230; and the display panel driver 251 is configured to drive the display panel 250. Further, the synchronization controller controls and keep synchronization among the light-splitting device driver 200, the polarization state controller driver 231, and the display panel driver 251.

The display panel 250 may use electrical-modulated light to form images and to display two-dimensional (2D) images or 3D images. The display panel 250 may be formed by coupling a polarizer with any appropriate display panel, such as a plasma display panel (PDP), an organic light emitting display (OLED) panel, or a field emission display (FED) panel, or by a liquid crystal display (LCD) panel structure already containing the polarizer. The display panel 250 may have a relatively high refresh rate, such as 120 Hz or 240 Hz.

The light-splitting device 21 is configured to effect light separation, e.g., at a first point of time and a second point of time, so as to transmit different images to the two eyes of a viewer. The polarization state controller 230 is disposed between the display panel 250 and the light-splitting device 21, and is configured to modulate the polarization state of the light emitted from the display panel 250 so as to match the modulated light and the polarization state required by the light-splitting device 21.

More specifically, the polarization state controller 230 may include a first substrate, a second substrate, and a 90°-twisted nematic liquid crystal layer (not labeled). The 90°-twisted nematic liquid crystal layer is disposed between the first substrate and the second substrate. The alignment layer on the substrate of the polarization state controller 230 close to the display panel 250 may have a rubbing direction same as the polarization direction of the polarized light emitted from the display panel 250.

In operation, polarized light from the display panel 250 can be controlled, under different control conditions, to exit in two different linear polarization states, respectively. For example: the polarization direction of the polarized light emitted from the display panel 250 can be defined as the first polarization direction. When the polarized light passes the polarization state controller 230, without any voltage being applied, the polarization direction is changed by approximately 90°, and the changed polarization direction is defined as the second polarization direction. Further, when the polarization state controller 230, i.e., the liquid crystal layer, is applied by a saturation voltage, the liquid crystal layer will lose its optical rotation, and the light emitted will be transmitted in accordance with the first polarization direction.

Figure 3:
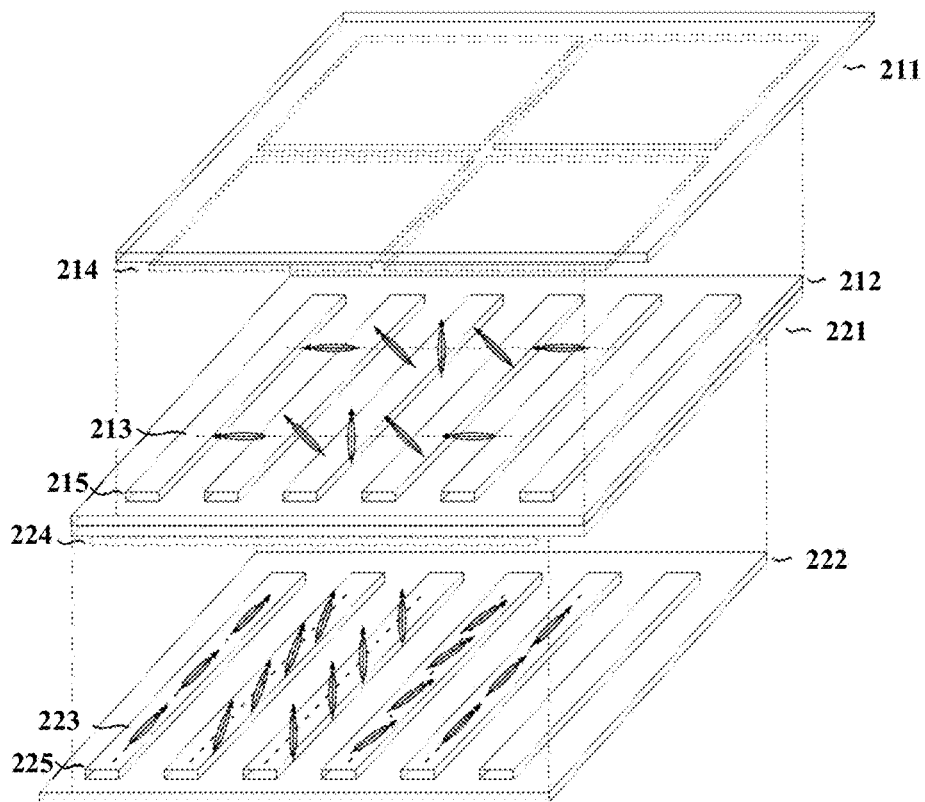
FIG. 3 illustrates an exemplary double-layer liquid crystal lens grating consistent with the disclosed embodiments.

The light-splitting device 21 may have a double-layer liquid crystal lens grating structure. As shown in FIG. 3, the double-layer liquid crystal lens grating may include a first liquid crystal lens grating 220 and a second liquid crystal lens grating 210.

The first liquid crystal lens grating 220 may include a third substrate 221 and a fourth substrate 222. The third substrate 221 and the fourth substrate 222 may be arranged opposite to each other and each may contain a plurality of lens areas. The plurality of lens areas are formed by a plurality of first electrodes 224 and second electrodes 225 on the third substrate 221 and the fourth substrate 222, respectively.

The first electrode 224 may use a single surface electrode structure or multiple surface electrodes, and the second electrode 225 may use a plurality of strip-shaped electrodes. Other structures may also be used by the first electrode 224 and second electrodes 225.

The first electrode 224 and second electrode 225 are coated with a first alignment layer and a second alignment layer, respectively, which may have a same rubbing direction parallel or perpendicular to the longitudinal direction of the corresponding electrodes. The first liquid crystal layer 223 is filled between the first alignment layer and the second alignment layer. Further, the first electrode 224 on the third substrate 221 and the second electrode 225 on the fourth substrate 222 are connected to light-splitting device driver 200.

The second liquid crystal lens grating 210 may includes a fifth substrate 211 and a six substrate 212. The fifth substrate 211 and the sixth substrate 212 may be arranged opposite to each other and each may contain a plurality of lens areas. The plurality of lens areas are formed by a plurality of third electrodes 214 and fourth electrodes 215 on the fifth substrate 211 and the sixth substrate 212, respectively.

The third electrode 214 may use a single surface electrode structure or multiple surface electrodes, and the fourth electrode 215 may use a plurality of strip-shaped electrodes. Other structures may also be used by the third electrode 214 and fourth electrode 215.

The third electrode 214 and fourth electrode 215 are coated with a third alignment layer and a fourth alignment layer, respectively, which may have same rubbing direction parallel or perpendicular to the longitudinal direction of the corresponding electrodes. The second liquid crystal layer 213 is filled between the third alignment layer and the fourth alignment layer. Further, the third electrode 214 on the fifth substrate 211 and the fourth electrode 215 on the sixth substrate 212 are connected to light-splitting device driver 200.

The first liquid crystal lens grating 220 and the second liquid crystal lens grating 220 may have the similar or same structure. The difference between the first liquid crystal lens grating 220 and the second liquid crystal lens grating 220 includes that the rubbing direction of the first alignment layer in the first liquid crystal lens grating 220 and the rubbing direction of the third alignment layer in the second liquid crystal lens grating 210 have an angle of approximately 90°.

The first liquid crystal lens grating 220 and the second liquid crystal lens grating 210 in the double-layer liquid crystal lens grating structure may be bonded together by adhesive. For example, the first liquid crystal lens grating 220 and the second liquid crystal lens grating 210 may be bond together using UV adhesive glue or other transparent adhesive agents, while keeping the longitudinal direction of the first electrode in the first liquid crystal lens grating 220 and the longitudinal direction of the third electrode in the second liquid crystal lens grating 210 in parallel.

Figure 4:
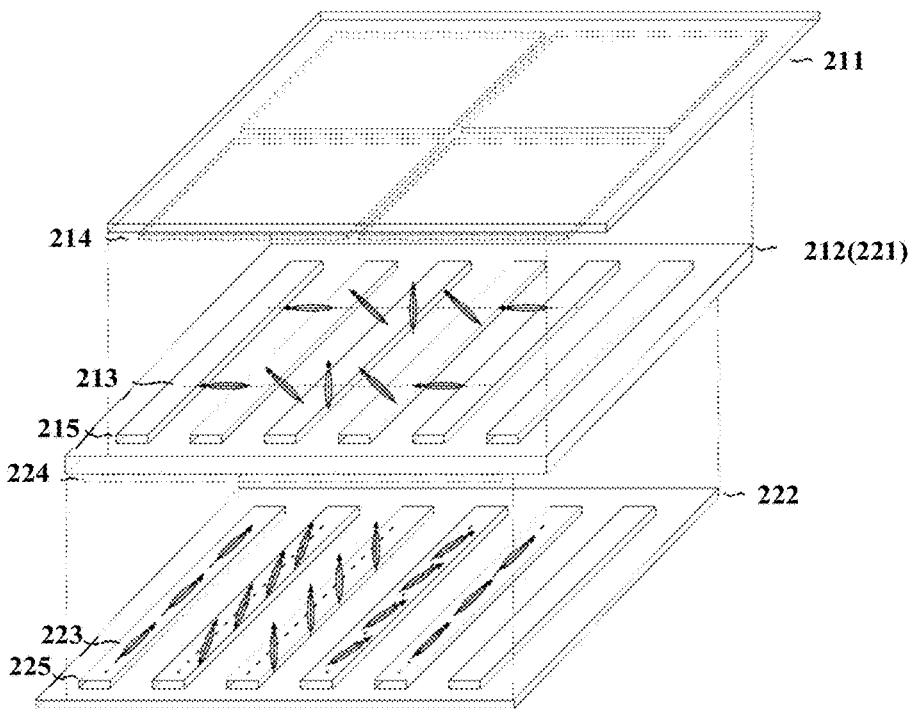
FIG. 4 illustrates an exemplary liquid crystal lens grating structure based on a common substrate consistent with the disclosed embodiments.

The double-layer liquid crystal lens grating structure may also use a common substrate. That is, the first liquid crystal lens grating 220 and the second liquid crystal lens grating 210 use a same substrate, and electrodes can be formed on both upper and lower surfaces of the common substrate. Using the common substrate can reduce a total thickness of the liquid crystal lens grating structure, eliminating position errors. FIG. 4 illustrates an exemplary liquid crystal lens grating structure based on a common substrate.

As shown in FIG. 4, the sixth substrate 212 and the third substrate 221 are implemented as a common substrate. The electrode layers are formed on both the upper and lower surfaces of the common substrate, and both surfaces are rubbed during production process with perpendicular rubbing directions. Other structures of the common substrate based liquid crystal lens grating are the same as the liquid crystal lens grating shown in FIG. 3.

Returning to FIG. 2, in the present invention, the light-splitting device driver 200, the polarization state controller driver 231, and the display panel driver 251 may be separate drive circuitries, or may be integrated in a same drive unit. The light-splitting device driver 200, the polarization state controller driver 231, and the display panel driver 251 may communicate with one another and to achieve operating mode switch and adjustment.

More specifically, light-splitting device driver 200 is configured to switch between 2D display and 3D display, and to change the lens position by adjusting the driving voltage to correct certain errors, such as production errors.

Polarization state controller driver 231 is configured to provide state switching signals to the polarization state controller 230. Polarization state controller driver 231 receives related signals from the display panel driver 251 to control the polarization state switching.

Display panel driver 251 is configured to control the display panel 250 to display 2D or 3D images. Display panel driver 251 also sends related signals to light-splitting device driver 200 and polarization state controller driver 231 such that the various drivers can work in a synchronized mode.

Further, in one embodiment, the liquid crystal layer of the polarization state controller 230 has a twist angle of 90°, and can generate polarized light with different polarization states at different time, respectively. The thickness of the liquid crystal layer between the upper and lower substrates of the polarization state controller 230 cannot be too large. Under normal circumstances, the thickness of the liquid crystal layer may satisfy the Morgan condition, that is, the product of the twist pitch of the liquid crystal molecules and the refractive index anisotropy is substantially greater than half of the wavelength of the incident light, such that, when the incident light passes through the liquid crystal layer, the polarization plane rotation is independent of the wavelength. The switching time of the polarization state of the incident light should be less than 16 ms, which is below the human visual response time. Also, it may require that polarization direction of the light emitted from the display panel, when reaching the polarization state controller, is parallel with or perpendicular to the rubbing direction of the alignment layer of the corresponding substrate of the polarization state controller.

Figure 5:
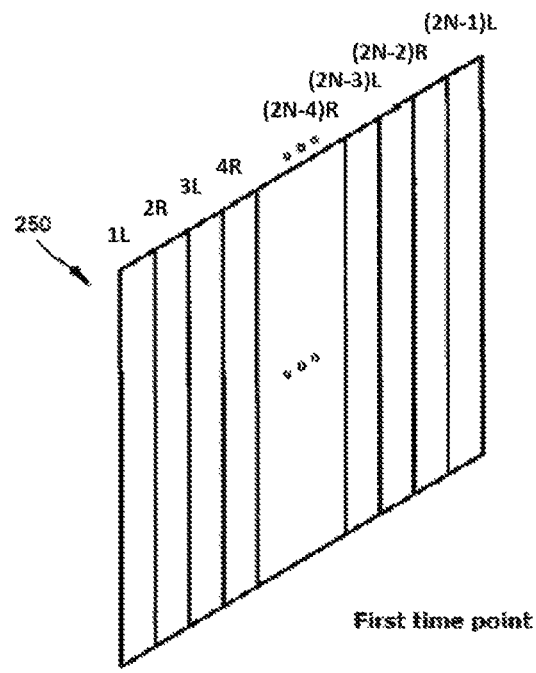
FIGS. 5-6 illustrate an operating process of a full resolution autostereoscopic display consistent with the disclosed embodiments.
Figure 6:
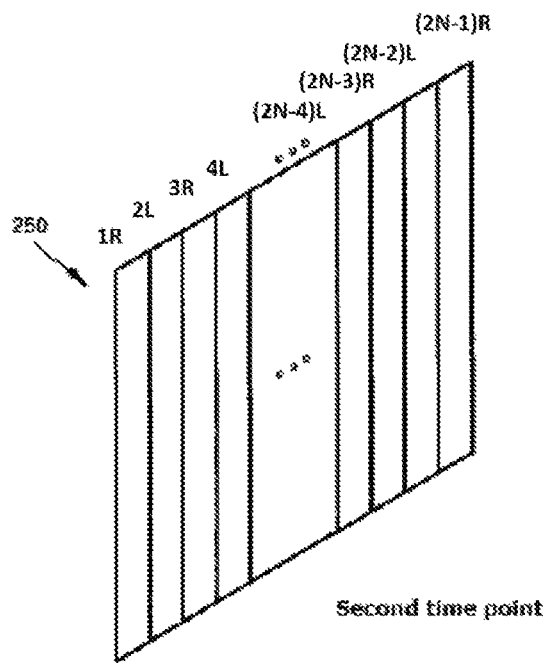

FIG. 5 and FIG. 6 illustrate an operating process of a full resolution autostereoscopic display. As shown in FIG. 5 and FIG. 6, the display panel 250 outputs image data at a first time point, and the display panel 250 also outputs image data at a second time point. In the original image, the left image (left-eye image) and the right image (right-eye image) are obtained from two different observation points of two cameras. The left image includes odd-numbered columns (1L, 3L, 5L, . . . , (2n−1) L) (n is a natural number) and even-numbered column (2L, 4L, . . . , (2n−2) L). Similarly, the right image includes odd-numbered columns (1R, 3R, 5R, . . . , (2n−1) R) and even-numbered column (2R, 4R, . . . , (2n−2) R). When the combined odd columns and even columns of an image are displayed, the display image has a full resolution.

More particularly, at the first time point, the display image includes odd columns (1L, 3L, 5L, . . . , (2n−1) L) of the left image, and even columns (2R, 4R, . . . , (2n−2) R) of the right image, in an alternating format. Further, at the second time point, the display image includes even-numbered column ((2L, 4L, . . . , (2n−2) L) of the left image, and the odd columns (1R, 3R, 5R, . . . , (2n−1) R) of the right image, in an alternating format. Thus, during the time period between the first time point and the second time point, a full resolution left image of odd columns (1L, 3L, 5L, . . . , (2n−1) L) of the left image and even-numbered column ((2L, 4L, . . . , (2n−2) L) of the left image, and a full resolution right image of even columns (2R, 4R, . . . , (2n−2) R) of the right image and the odd columns (1R, 3R, 5R, . . . , (2n−1) R) of the right image can be displayed to the left eye and the right eye, respectively.

Figure 7:
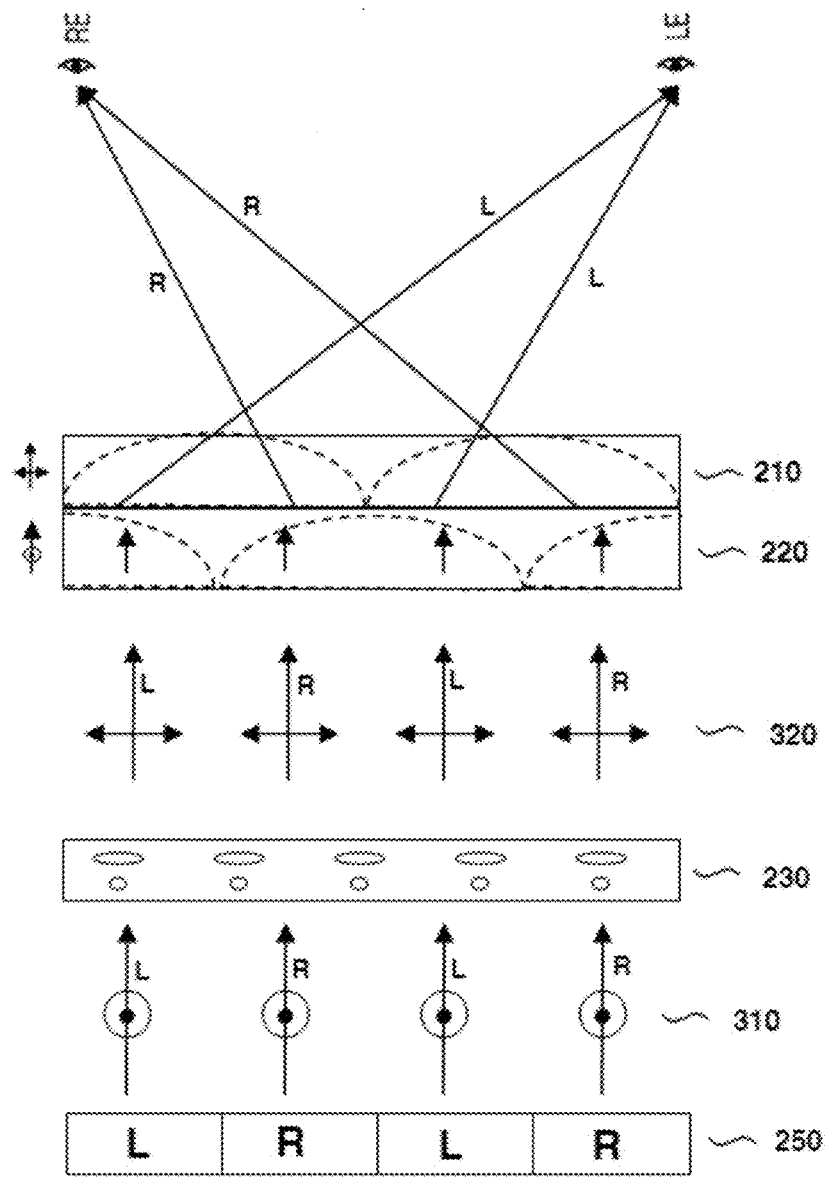
FIG. 7 illustrates various operating states of certain devices during 3D display at the first time point consistent with the disclosed embodiments.

FIG. 7 illustrates various operating states of certain devices during 3D display at the first time point. As shown in FIG. 7, at the first point of time, L represents the propagation direction of the light from left-eye pixels, and R represents the propagation direction of the light from right-eye pixels. At this point, the first liquid crystal lens grating 220 and the second liquid crystal lens grating 210 form lens shape (dotted lines) under driving voltages provided by the light-splitting device driver 200. The polarization state controller 230 is in the OFF state (i.e., without a voltage), which means that the polarization direction of the passing polarized light will be changed by 90°.

First, image signals corresponding to odd columns of the left image and image signals corresponding to even columns of the right image are inputted into the display panel 250 via the display panel driver 251. That is, at the first point of time, the image to be displayed is formed by the odd columns of the left image and the even columns of the right image. Light emitted from backlight plate 240 passes through the display panel 250 and is loaded with the image information of the combined image. The light then exits the display panel 250 as polarized light with a vertical polarization state 310. After passing through the polarization state controller 230, the polarization state is rotated 90° to become a horizontal polarization state 320.

As shown in FIG. 7, the longitudinal direction of the electrode of the first liquid crystal lens grating 220 is perpendicular to this paper. Provided that the rubbing direction of the alignment layer of the first liquid crystal lens grating 220 is parallel to the electrode direction, i.e., perpendicular to the paper, no change in the direction of the light when passing the first liquid crystal lens grating 220, and the light continue the same propagation direction. At this point, the rubbing direction of the alignment layer of the lens 210 is parallel to the paper, when the horizontally-polarized light reaches the second liquid crystal lens grating 210, the second liquid crystal lens 210 can cause light separation. That is, the first liquid crystal lens 220 can separate the odd columns of the left image to the left eye (LE), and separate the even columns of the right image to the right eye (RE). Because of the parallax between the left image and the right image, the left eye and the right eye can view a 3D image at the first point of time.

Figure 8:
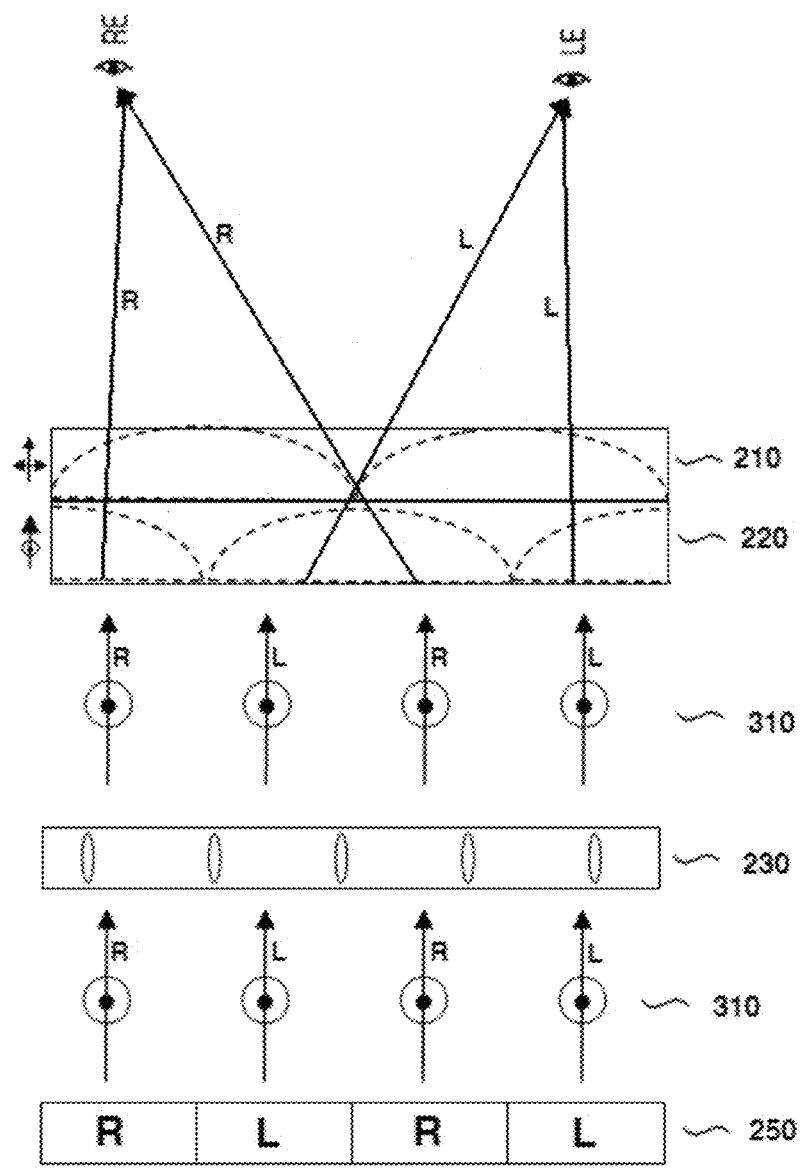
FIG. 8 illustrates various operating states of certain devices during 3D display at the second time point consistent with the disclosed embodiments.

FIG. 8 illustrates various operating states of certain devices during 3D display at the second time point. As shown in FIG. 8, at the second point of time, L represents the propagation direction of the light from left-eye pixels, and R represents the propagation direction of the light from right-eye pixels. At this point, the first liquid crystal lens grating 220 and the second liquid crystal lens grating 210 form lens shape under driving voltages provided by the light-splitting device driver 200. The polarization state controller 230 is in the ON state (i.e., with a driving voltage), which means that the polarization direction of the passing polarized light will not change.

Image signals corresponding to even columns of the left image and image signals corresponding to odd columns of the right image are inputted into the display panel 250 via the display panel driver 251. That is, at the second point of time, the image to be displayed is formed by the even columns of the left image and the odd columns of the right image. Light emitted from backlight plate 240 passes through the display panel 250 and is loaded with the image information of the combined image. The light then exits the display panel 250 as polarized light with a vertical polarization state 310. After passing through the polarization state controller 230, the polarization state is unchanged and remains as a vertical polarization state 310.

The longitudinal direction of the electrode of the first liquid crystal lens grating 220 is perpendicular to this paper. Provided that the rubbing direction of the alignment layer of the first liquid crystal lens grating 220 is parallel to the electrode direction, i.e., perpendicular to the paper, the direction of the light when passing the first liquid crystal lens grating 220 changes because the vertical polarization direction of the light. Thus, the first liquid crystal lens grating 220 can cause light separation. That is, the second liquid crystal lens grating 220 can separate the even columns of the left image to the left eye (LE), and separate the odd columns of the right image to the right eye (RE). Because of the parallax between the left image and the right image, the left eye and the right eye can view a 3D image at the second point of time. Due to the human visual reaction time limit, a full resolution left image and a full resolution right image can be perceived by the viewer's left eye and right eye, respectively.

Therefore, by alternately displaying the odd columns and the even columns of the original parity region image, the combined odd column image and even column image can achieve the full resolution image for 3D image display. Because the alternating speed is higher than the up-limit of the human eye response time, half of the full resolution can be used in a single frame time to display the image of the first time point or the second time point, and the full resolution image can be displayed without any flicker.

Because the display panel 250 may use progressive refreshing, the polarization state controller 230 may be synchronized to the refresh rate of the display panel 250. Thus, the odd column image and even column image can match the image signals on the display panel 250 to display the left image and the right image to the left eye and the right eye, respectively, reducing crosstalk caused by the scan on the display panel and improving image quality.

Figure 9:
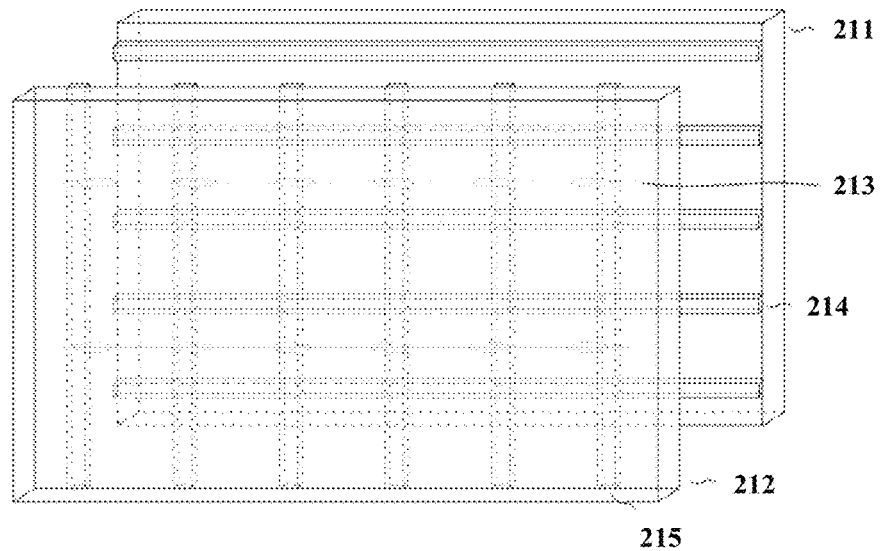
FIG. 9 illustrates a double-layer liquid crystal lens grating structure based on strip-shaped electrodes consistent with the disclosed embodiments.

FIG. 9 illustrates a double-layer liquid crystal lens grating structure based on strip-shaped electrodes. Electrodes on the glass substrates of the first liquid crystal lens grating 220 and the second liquid crystal lens grating 210 may be adjusted. For example, the upper electrodes and the lower electrodes are designed as stripe electrodes perpendicular to each other.

As shown in FIG. 9, using the second liquid crystal lens grating 210 as an example, the third electrode 214 and the fourth electrode 215 of the second liquid crystal lens grating 210 are stripe electrodes perpendicular to each other.

In certain embodiments, the rubbing directions of the first liquid crystal lens grating 220 and the second liquid crystal lens grating 210 are still perpendicular to each other. Perpendicular strip electrodes may be used to achieve 3D effects in both directions, similar to a gravity sensing device in a cell phone or tablet. In the actual design, gravity sensing device(s) may also be added.

Specifically, defining the two mutually perpendicular display orientations as the first direction and the second direction, two directions in the gravity sensing device corresponding to display orientations can be defined such that the two lens grating layers (perpendicular to each other) can correspond to the tow display directions. When the gravity sensing device determines the first direction, corresponding display signals are sent to the double-layer lens gratings. After receiving the display signals, the double-layer lens gratings can use matching electrodes and apply certain voltages to form lens structures in the corresponding direction to achieve 3D display at the first direction.

When the gravity sensing device determines the second direction, corresponding display signals are sent to the double-layer lens gratings. After receiving the display signals, the double-layer lens grating can use matching electrodes and apply certain voltages to form lens structure in the corresponding direction to achieve 3D display at the second direction.

Further, in addition to the electrode-based double-layer liquid crystal lens gratings, the light-splitting device may also be implemented based on double-layer solid lens grating with 2D/3D switching capability for realizing the first lens grating and the second lens grating. The micro-lens formed in the double-layer solid lens grating may have different positions so as to cause light-splitting effects at the first time point and the second time point, respectively, and to send different images to the left eye and the right eye. The images from the two time points are then combined to achieve full resolution display.

The double-layer solid lens grating may include a single-refractive-index lens and a double-refractive-index lens (i.e., a birefringent lens). The single-refractive-index lens and the double-refractive-index lens may have same micro-lens parameters. However, in order to match the 3D display parameters, the refractive indices, and the surface curvature radius of the single-refractive-index lens and the double-refractive-index lens may vary.

Figure 10:
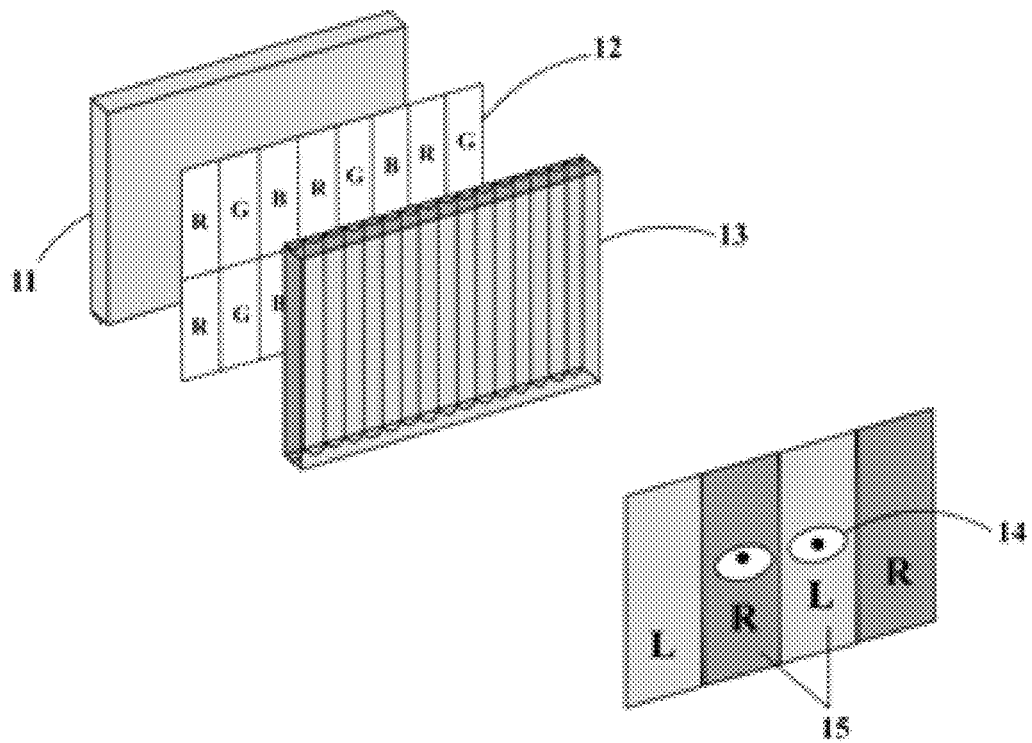
FIG. 10 illustrates exemplary structures of an autostereoscopic display device consistent with the disclosed embodiments.

For example, each of the single-refractive-index lens and double-refractive-index lens may have a flat surface and a curve surface, and the curvature radius of the single-refractive-index lens and double-refractive-index lens may be the same such that the single-refractive-index lens and double-refractive-index lens may be mutually fitted together. Thus, based on whether the polarization direction of the light emitting from the polarization state controller is rotated or not, the double-layer liquid crystal lens grating may act as a convex lens or as a flat lens. FIG. 10 illustrates structures of an autostereoscopic display device consistent with the disclosed embodiments.

As shown in FIG. 10, a backlight 11 is used to provide light for the entire system. Backlight 11 may include any appropriate type of backlight structures used in display panels. A display panel 12 is provided for displaying stereoscopic images with parallax and may include any appropriate type of display, such as a LCD panel, an OLED panel, and any other type of display panel. R, G, B represent pixels in the images/display panel.

Further, light-splitting device 13 is provided for respectively projecting view images with parallax to the left eye and the right eye of a viewer. The viewer's eyes 14 are located within a 3D viewable area 15 and are capable of receiving the view images with parallax to perceive 3D display in the human brain.

Figure 11:
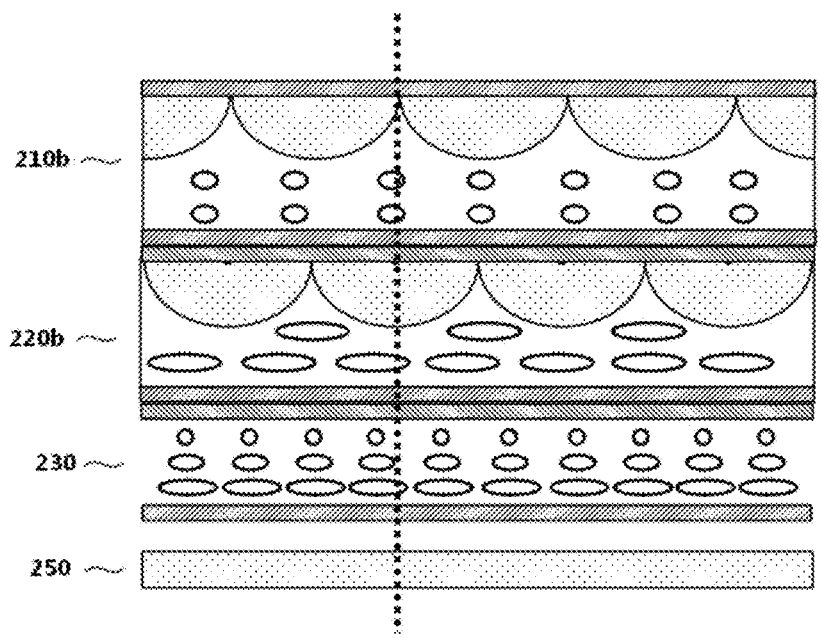
FIG. 11 illustrates an exemplary autostereoscopic display device based on a double-layer solid lens grating structure consistent with the disclosed embodiments.

FIG. 11 illustrates an exemplary autostereoscopic display device based on a double-layer solid lens grating structure. As shown in FIG. 11, the display device includes a first solid lens grating 210b, a second solid lens grating 220b, a polarization state controller 230, and a display panel 250. Both first solid lens grating 210b and the second solid lens grating 220b are combined lenses of a single-refractive-index lens and a double-refractive-index lens. However, the material refractive index and curvature radius of lens surface in the lenses may be different.

Generally, the curvature radius of the first solid lens grating 210b is larger than the curvature radius of the second solid lens grating 220b. That is, the focal length of the micro-lens in the first solid lens grating 210b is greater than the focal length of the micro-lens in the second solid lens grating 220b. The single-refractive-index lenses in the two solid lens gratings are offset by half of the lens (e.g., half length of the micro-lens), as shown in FIG. 11.

Further, the two birefringent lenses in two solid lens gratings may have different refractive indices for the polarization direction parallel to the paper and the polarization direction perpendicular to the paper. For example, the first solid lens grating 210b may have a refractive index $n_o$ for incident light with a polarization direction parallel to the paper, and may have a refractive index $n_e$ for the incident light with a polarization direction perpendicular to the paper. The second solid lens grating 220b may have a refractive index $n_e$ for incident light with a polarization direction parallel to the paper, and may have a refractive index $n_o$ or the incident light with a polarization direction perpendicular to the paper.

If the two birefringent lenses are made by curing liquid crystal, during the production, the alignment directions of the liquid crystal of the two gratings are exactly perpendicular to each other by approximately 90°. The first solid lens grating 210a and the second solid lens grating 220b may be bond together using UV adhesive.

The operation principle for the double-layer solid lens grating is in general the same as the double-layer liquid crystal lens grating. The differences includes that the double-layer solid lens grating does not require drive circuitry. During 3D display, the polarization state controller and the display panel are coupled together, if linear polarized light emitted from the display panel is horizontally polarized light, after refreshing of the first frame of the image is completed, the polarization state controller controls the linearly polarized light from the display panel into a first polarization state; after refreshing of the second frame of the image is completed, the polarization state controller controls the linearly polarized light from the display panel into a second polarization state perpendicular to the first polarization state, and so on. During 2D display, only the images are 2D images, the system drive signals do not change. Because the display panel itself has full resolution, the display quality can be maintained at the same level as 3D display.

Figure 12:
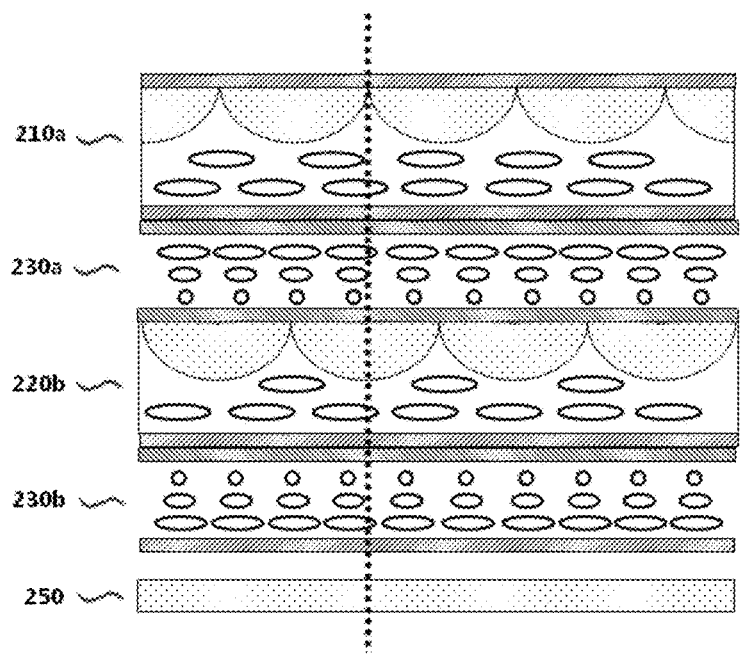
FIG. 12 illustrates an exemplary autostereoscopic display device based on the double-layer solid lens grating consistent with the disclosed embodiments.

FIG. 12 illustrates an exemplary autostereoscopic display device based on the double-layer solid lens grating. As shown in FIG. 12, the autostereoscopic display device includes, as sequentially arranged, a display panel 250, a second polarization state controller 230b, a fourth solid lens grating 220b, a first polarization state controller 230a, and a third solid lens gratings 210a. Other components may also be included.

The third solid lens grating 210a and the fourth solid lens grating 220b are combined lenses of a single-refractive-index lens and a double-refractive-index lens. However, the material refractive index and curvature radius of lens surface of these two solid lens gratings may be different.

Generally, the curvature radius of the third solid lens grating 210a is larger than the curvature radius of the fourth solid lens grating 220b. That is, the focal length of the micro-lens in the third solid lens grating 210a is greater than the focal length of the micro-lens in the fourth solid lens grating 220b. The single-refractive-index lenses in the two solid lens gratings 210a and 220b are offset by half of the lens, as shown in FIG. 11.

Further, the two birefringent lenses in two solid lens gratings may have the same refractive indices for the polarization direction parallel to the paper and the polarization direction perpendicular to the paper. That is, both have a refractive index $n_o$ for incident light with a polarization direction parallel to the paper, and a refractive index $n_e$ for the incident light with a polarization direction perpendicular to the paper. If the two birefringent lenses are made by curing liquid crystal, during the production, the alignment directions of the liquid crystal of the two gratings are the same.

The operation principle for the double-layer solid lens grating is in general the same as the tow-layer liquid crystal lens grating. The differences includes that the double-layer solid lens grating does not require drive circuitry. During 3D display, the display panel 250, the first polarization state controller 230a, and the second polarization state controller 230b are arranged to complete the image display and control.

If linear polarized light emitted from the display panel is horizontally polarized light, after refreshing of the first frame of the image is completed, voltage is applied on the second polarization state controller 230b to keep the linearly polarized light from the display panel unchanged, while the fourth solid lens grating 220b acts as a convex lens to split the light. Voltage is also applied on the first polarization state controller 230a to change the linearly polarized light into a perpendicular polarization state, thus the third solid lens grating 210a does not affect the linearly polarized light. The 3D images effected by the fourth solid lens grating 220b can be propagated to the viewer.

After refreshing of the second frame of the image is completed, no voltage is applied on the second polarization controller 230b to change the linearly polarized light into a vertically polarized light, and the fourth solid lens grating 220b has no effect. Further, voltage is applied on the first polarization state controller 230a to change the vertically polarized light into horizontally polarized light, and the third lens grating 210a acts as a convex lens to split the light. The 3D images effected by the third solid lens grating 210a can be propagated to the viewer. Thus, by combining the two frames of the image, a full resolution 3D display can be achieved.

Returning to FIG. 10, the light-splitting device 13 can be implemented using a multi-layer lens grating, e.g., using liquid crystal grating technique and using combination of single-refractive-index lens and double-refractive-index lens to achieve convex lens effect, to realize full resolution HD 3D display.

For example, the light-splitting device 13 may include a single-refractive-index lens and a double-refractive-index lens. The single-refractive-index lens and the double-refractive-index lens are combined to form a combined lens. The single-refractive-index lens and double-refractive-index lens may have a flat surface and a curve surface, and the curvature radius of the single-refractive-index lens and double-refractive-index lens may be the same such that the single-refractive-index lens and double-refractive-index lens may be mutually fitted together. Thus, based on whether the polarization direction of the light emitting from the polarization state controller is rotated or not, the combined lens may act as a convex lens or as a flat lens.

The single-refractive-index lens may be a single-refractive-index convex lens, and the double-refractive-index lens may be a double-refractive-index convex lens. The refractive index of the single-refractive-index lens may be equal to the one refractive index of the double-refractive-index lens, but is greater than the other refractive index of the double-refractive-index lens.

In one embodiment, the double-refractive-index convex lens has an ordinary light refractive index $n_o$ and an extraordinary light refractive index $n_e$; while the single-refractive-index lens has a refractive index that is equal to the ordinary light refractive index $n_o$ and is greater than the extraordinary light refractive index $n_e$.

Figure 13:
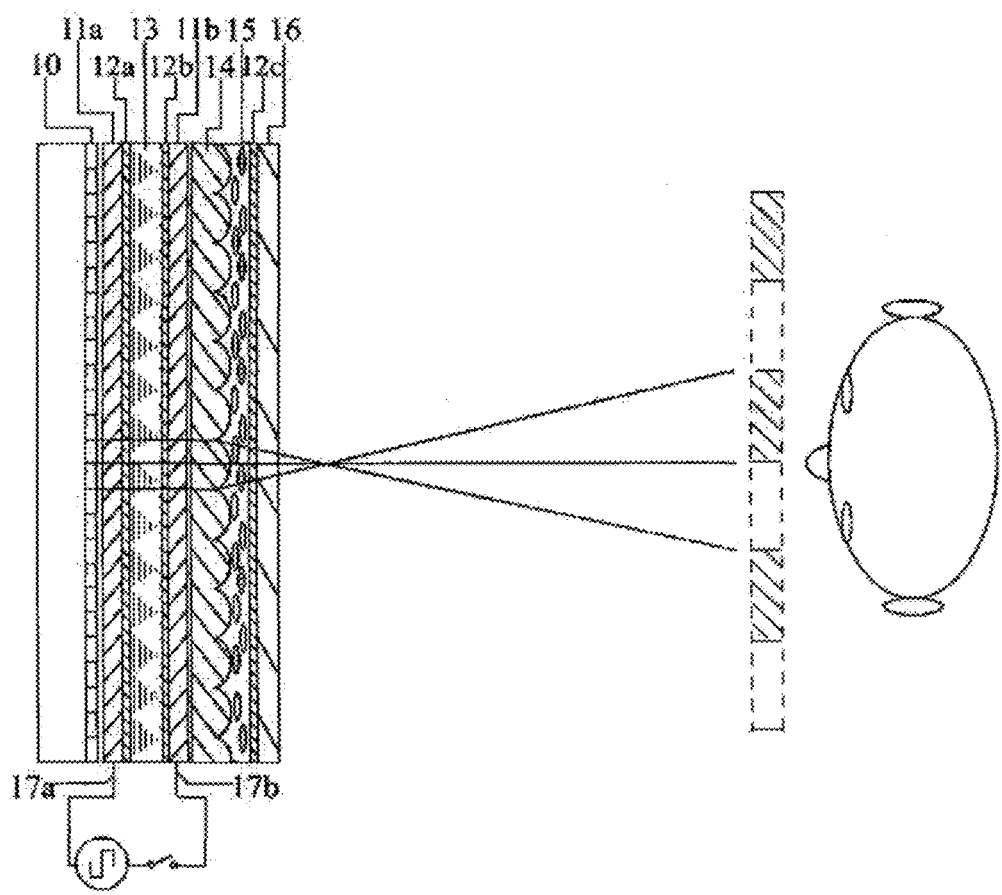
FIG. 13 illustrates an exemplary autostereoscopic display device consistent with the disclosed embodiments.

FIG. 13 illustrates an exemplary autostereoscopic display device. As shown in FIG. 13, the display device includes a display panel 10, a polarization state controller, and a light-splitting device. Other components may also be included.

The display panel 10 is configured for providing a 2D or 3D image, and the polarization state controller is used to rotate the polarization direction of the polarized light from the display panel by approximately 90 degrees in the 2D mode, and to maintain the polarization direction of the polarized light from the display panel unchanged in the 3D mode.

The light-splitting device is configured for passing the provided images in the 2D mode, while separating the provided image into a right image and a left image in the 3D mode. The light-splitting device includes a single-refractive-index lens and a double-refractive-index lens.

The polarization state controller may use similar structure to that of TN type liquid crystal unit, comprising two glass substrates 11a and 11b, alignment layers 12a and 12b, internally filled nematic liquid crystal 13, all being packaged together. The power may be provided to glass substrates 11a and 11b through electrodes 17a and 17b, respectively. Molecules in the two alignment layers are aligned vertically at about 90 degrees.

When light emitted from the display panel 10 is not linearly polarized, a polarizer may be disposed in front of the display panel 10, such that the light entering the polarization state controller is linearly polarized light. When no voltage is applied, the polarization direction of the linearly polarized light is the same as the direction of the alignment layer 12a, the polarization direction of the linearly polarized light is gradually rotated by 90 degrees along the axial direction of the liquid crystal molecules, and emits at a direction parallel to the axial direction of the surface liquid crystal molecules of the alignment layer 12b. If the display panel 10 of the emitted light is linearly polarized light, the polarizer may not be needed.

The light-splitting device includes a single-refractive-index convex lens 14, a double-refractive-index concave lens 15, and a glass substrate 16. The single-refractive-index convex lens 14 and the double-refractive-index concave lens 15 may comprise a plurality of micro lenses 15, also be called a lens array.

The single-refractive-index convex lens 14 may have a refractive index $n_1$, and the double-refractive-index concave lens 15 may have an ordinary refractive index $n_o$, and an extraordinary refractive index $n_e$, and $n_1=n_o$, $n_1>n_e$. The single-refractive-index convex lens 14 may be made of polymer or other transparent rigid materials, and the double-refractive-index concave lens 15 may be made of negative nematic liquid crystal, a cholesteric liquid crystal, or calcite. If liquid crystal is used, the liquid crystal can be filled in the space between the single-refractive-index convex lens 14 and the glass plate 16 when in liquid state. Alignment layer 12c may be formed on the surface of the glass plate 16 (the alignment layer 12c and the glass plate 16 may also be disposed non-adjacent). The surface of the single-refractive-index convex lens 14 is aligned or rubbed such that the alignment direction of the liquid crystal is the same as the polarized light emitted from the display panel.

Figure 14A:
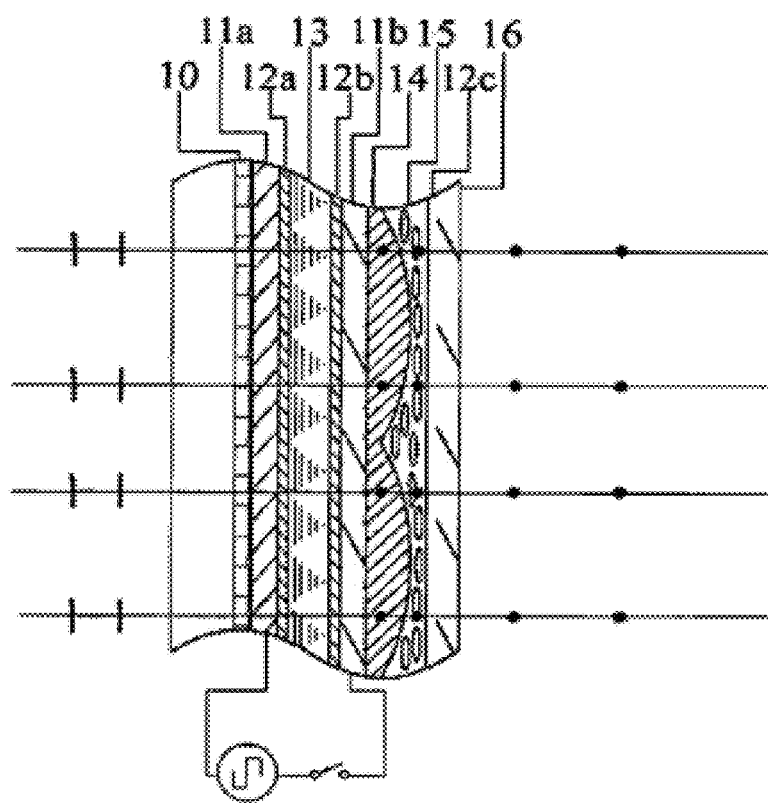
FIGS. 14a-14b illustrate optical path diagrams of the polarization state controller and the light-splitting device before and after voltage is applied consistent with the disclosed embodiments.
Figure 14B:
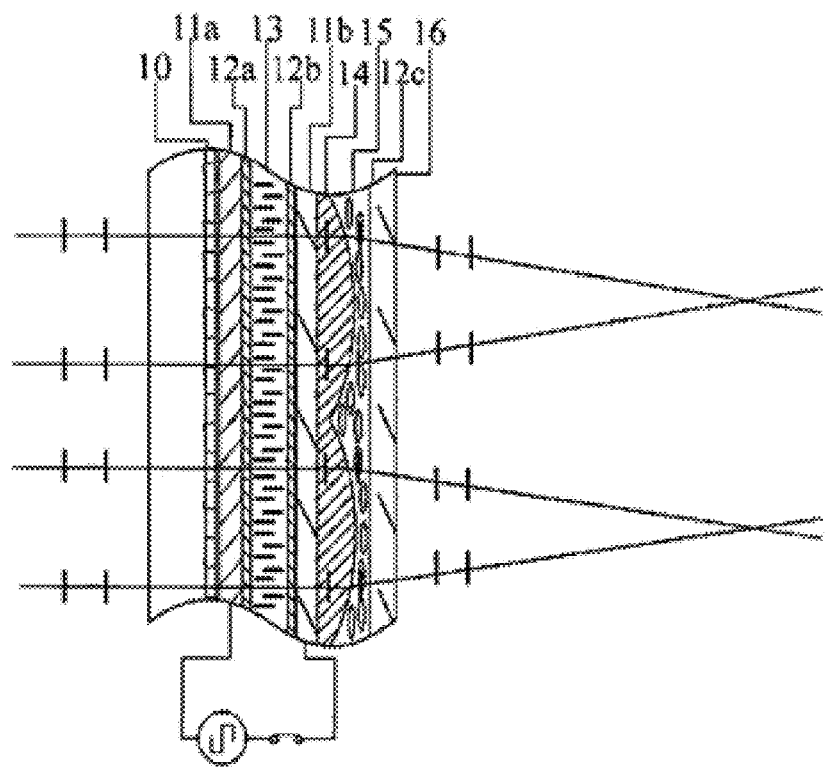

FIG. 14a and FIG. 14b illustrate optical path diagrams of the polarization state controller and the light-splitting device before and after voltage is applied.

As shown in FIG. 14a, before the voltage is applied, the polarization direction of incident polarized light is the same as the alignment direction of the alignment layer 12a, since the liquid crystal inside the polarization state controller can rotate the polarization direction of the incident polarized light by 90 degrees, the polarized light passes through the polarization state controller with a 90 degree rotation and reaches the light-splitting device. At this point, the polarization direction is perpendicular to the alignment direction of the liquid crystal of the double-refractive-index concave lens 15. The refractive index is $n_o$, the refractive index of the single-refractive-lens 14 is selected as $n_1=n_o$, i.e., the refractive index of the single-refractive-index convex lens 14 and the refractive index of the double-refractive-index concave lens 15 are the same. Thus, there is no refraction occurs at the interface between the single-refractive-index convex lens 14 and the double-refractive-index concave lens 15, and the light passes straight through. Under this condition, the autostereoscopic display device operates in the 2D mode.

As shown in FIG. 14b, a voltage is applied on the polarization state controller, the alignment direction of the liquid crystal are aligned along the electrical field, the polarized light passes through the polarization state controller without changing the polarization direction, and reaches the double-refractive-index concave lens 15. At this point, the polarization direction of the polarized light is in parallel to the liquid crystal alignment direction of the double-refractive-index concave lens 15, and the refractive index of the double-refractive-index concave lens 15 is $n_e$. Because the refractive index of the single-refractive-index convex lens 14 is $n_1 > n_e$, i.e., the refractive index of the single-refractive-index convex lens 14 is greater than the refractive index of the double-refractive-index concave lens 15, the combined lens acts as a convex lens, which causes refraction for passing light. Under this condition, light of the left image and the right image is separated for the left eye and the right eye of the viewer, such that the viewer can perceive the 3D image, a 3D mode.

The combination of the single-refractive-index convex lens 14 and the double-refractive-index concave lens 15 may be changed in various ways. For example, the combination of the single-refractive-index convex lens 14 and the double-refractive-index concave lens 15 may be rotated by 180 degrees. In this case, the flat part of the double-refractive-index concave lens 15 is facing the incident light, and the convex part of the single-refractive-index convex lens 14 is facing the incident light direction.

When the polarization direction of the incident light on the combined lens is in parallel to the liquid crystal alignment direction of the double-refractive-index concave lens 15, the refractive index is $n_e$, and the refractive index of single-refractive-index convex lens 14 is $n_1 > n_e$. The combined lens still acts as a convex lens and cause refraction of the incident light. The autostereoscopic display device operates in the 3D mode.

Further, when the polarization direction of the incident light on the polarization state controller is perpendicular to the alignment direction of the double-refractive-index concave lens 15, and the above control process can be reversed. That it, when no voltage is applied on the polarization state controller, the autostereoscopic display device operates in the 3D mode; when the voltage is applied on the polarization state controller, the display device operates in the 2D mode power. Of course, regardless of the polarization direction of the incident polarized light on the polarization state controller, the alignment direction of the liquid crystal on the entry side of the polarization state controller is the same as the polarization direction, such that the polarized light can be rotated by 90 degrees. Any device that can control the rotation and no rotation by 90 degrees can work with the combined lens to achieve the 2D/3D modes.

Using different materials for the double-refractive-index concave lens 15, different alignment direction or different combined lens structures may be created. For example, optical positive liquid crystal ($n_e > n_o$), such as n-nematic liquid crystal, may be used to make the double-refractive-index concave lens 15, which can also achieve the 3D/2D switching function though driving voltages.

Figure 15:
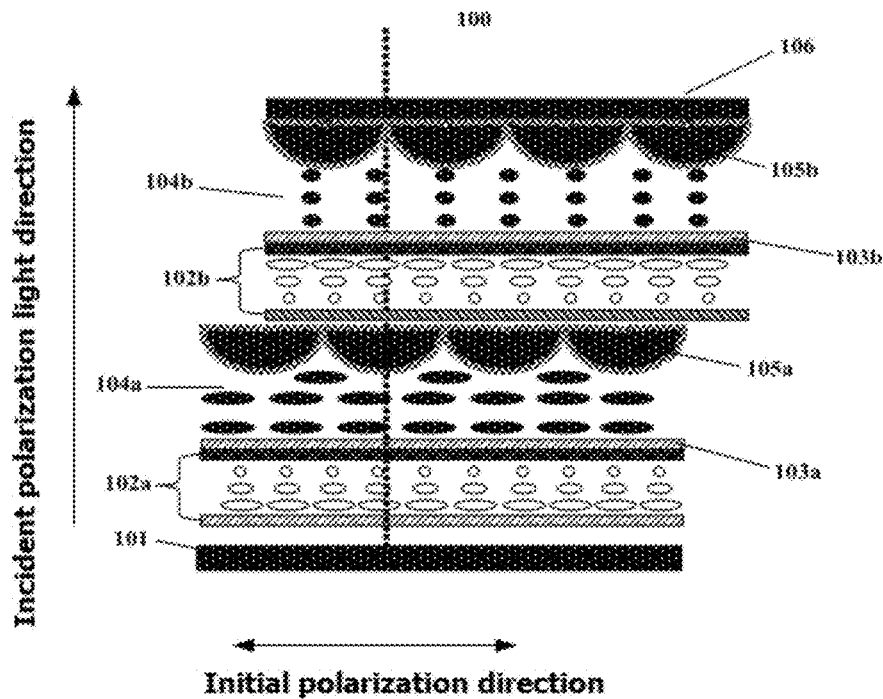
FIG. 15 illustrates exemplary autostereoscopic display device consistent with the disclosed embodiments.

FIG. 15 illustrates another exemplary autostereoscopic display device. As shown in FIG. 15, no voltage is applied on the autostereoscopic display device, a first single-refractive-index convex lens 105a and a second single-refractive-index convex lens 105b are both single-refractive-index lens arrays. The focal length of individual lens in the first single-refractive-index convex lens 105a and the second single-refractive-index convex lens 105b is the same. As shown in FIG. 5 as dotted lines, the lens array in the first single-refractive-index convex lens 105a and the lens array in the second single-refractive-index convex lens 105b are offset by half period. A first alignment layer 103a and the second alignment layer 103b provide alignment directions for the liquid crystal units 104a and 104b.

As shown in FIG. 15, polarized light emits from display panel 101 providing an image. The polarization direction of the polarized light is the same as the alignment direction on the surface of the first polarization state controller 102a. Because the liquid crystal inside the first polarization state controller 102a can rotate the incident polarized by 90 degrees, the polarization direction of the incident polarized light is rotated by 90 degrees after passing through the first polarization state controller 102a, and further reaches the liquid crystal unit 104a (refractive index $n_{o1}/n_{e1}$).

The polarization direction of the first polarization state controller 102a is perpendicular to the alignment direction of liquid crystal of the liquid crystal unit 104a, with a refractive index of $n_{o1}$. Based on selected material, the first single-refractive-index convex lens 105a has a refractive index of $n_{11}=n_{o1}$, i.e., the first single-refractive-index convex lens 105a has the same refractive index as the liquid crystal unit 104a. No refraction occurs at the interface of the first single-refractive-index convex lens 105a and the liquid crystal unit 104a, and light passes straight through to reach the second polarization state controller 102b.

The polarization direction of the incident polarized light, after conversion by the first polarization state controller 102a and when no voltage is applied on the first polarization state controller 102a, is the same as the alignment direction on the surface of the second polarization state controller 102b. Because the liquid crystal inside the polarization state controller can rotate the incident polarized light by 90 degrees, the polarized light is rotated by 90 degrees after passing through the second polarization state controller 102b and reaches the liquid crystal unit 104b (refractive index $n_{o2}/n_{e2}$). The polarization direction of the second polarization state controller 102b is perpendicular to the alignment of the liquid crystal unit 104b, and the refractive index is $n_{o2}$, while the second single-refractive-index convex lens 105a has a refractive index $n_{12}=n_{o2}$, i.e., the refractive index of the second single-refractive-index convex lens 105b and the refractive index of the liquid crystal unit 104b are the same. Thus, no refraction occurs at the interface between them, and the light passes straight through the glass substrate 106. In this case, the autostereoscopic display device operates in the 2D mode.

Figure 16A:
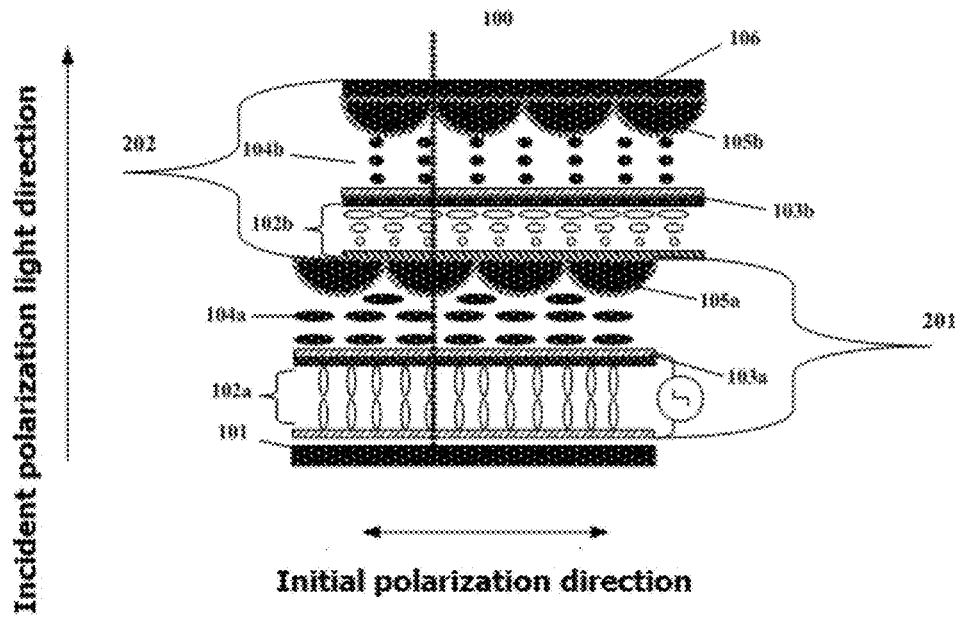
FIGS. 16a-16b illustrate device state when a set of drive voltages applied on a polarization state controller at time T1 and time T2 consistent with the disclosed embodiments.

FIG. 16*a* shows a set of drive voltages being applied on the first polarization state controller 102*a* at time T1. To simplify descriptions, the first polarization state controller 102*a*, the first alignment layer 103*a*, a first liquid crystal unit 104*a*, and the first single-refractive-index convex lens 105*a* are together labeled as the first lens assembly 201. Similarly, the second polarization controller 102*b*, the second alignment layer 103*b*, the second liquid crystal unit 104*b*, and the second single-refractive-index convex lens 105*b* are together labeled as the second lens assembly 202.

As shown in FIG. 16*a*, a voltage is applied on the first polarization state controller 102*a*, and the alignment direction of the liquid crystal are aligned along the electrical field, the polarized light passes through the polarization state controller without changing the polarization direction, and reaches the first liquid crystal unit 104*a*. At this point, the polarization direction of the polarized light is in parallel to the liquid crystal alignment direction of the first liquid crystal unit 104*a*, and the first liquid crystal unit 104*a* has a refractive index of $n_{e1}$. Depending on the selected material, the first single-refractive-index convex lens 105*a* has a refractive index $n_{11} > n_{e1}$, i.e., refractive index of the first single-refractive-index convex lens 105*a* is greater than the refractive index of the first liquid crystal unit 104*a*. The combined lens acts as a convex lens, which causes refraction of passing light.

At this time, because the liquid crystal inside the second polarization state controller 102*b* can rotate the incident polarized light by 90 degrees, the polarized light is rotated by 90 degrees after passing through the second polarization state controller 102*b* and reaches the liquid crystal unit 104*b* (refractive index $n_{o2}/n_{e2}$). The polarization direction of the second polarization state controller 102*b* is perpendicular to the alignment of the liquid crystal unit 104*b*, and the refractive index is $n_{o2}$, while the second single-refractive-index convex lens 105*a* has a refractive index $n_{12} = n_{o2}$, i.e., the refractive index of the second single-refractive-index convex lens 105*b* and the refractive index of the liquid crystal unit 104*b* are the same. Thus, no refraction occurs at the interface between them, and the light passes straight through the glass substrate 106. Thus, the 3D image effected by the first lens assembly 201 is displayed.

Figure 16B:
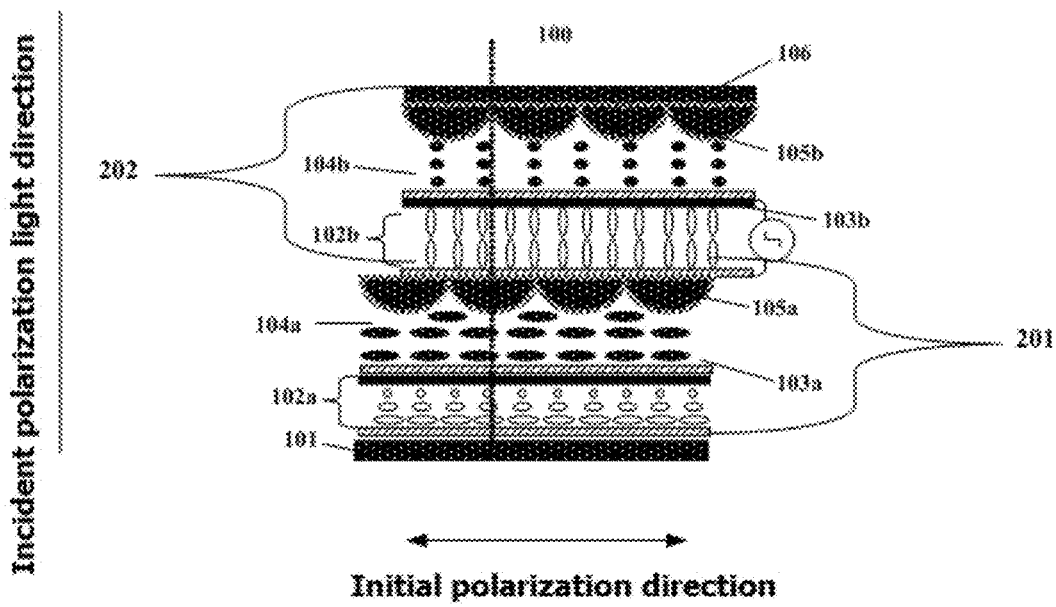

As shown in FIG. 16*b*, a voltage is applied on the second polarization state controller 102*b* at time T2. A set of driving voltages are applied on the second polarization state controller 102*b*, while no voltage is applied on the first polarization state controller 102*a*. Because the liquid crystal inside the first polarization state controller 102*a* can rotate the incident polarized light by 90 degrees, the polarized light is rotated by 90 degrees after passing through the first polarization state controller 102*a*. The combined lens of the first liquid crystal unit 104*a* and the first single-refractive-index convex lens 105*a* acts as a flat lens and the polarized light reaches the second polarization state controller 102*b*, without refraction.

When a voltage is applied in the second polarization state controller 102*b*, the alignment direction of the liquid crystal are aligned along the electrical field, and the polarized light passes through the polarization state controller without changing the polarization direction, and reaches the second liquid crystal unit 104*b*. At this point, the polarization direction of the polarized light is in parallel to the liquid crystal alignment direction of the second liquid crystal unit 104*b*, and the second liquid crystal unit 104*b* has a refractive index of $n_{e2}$. Depending on the selected material, the second single-refractive-index convex lens 105*b* has a refractive index $n_{12} > n_{e2}$, i.e., the refractive index of the second single-refractive-index convex lens 105*b* is greater than the refractive index of the second liquid crystal unit 104*b*. The combined lens acts as a convex lens, which causes refraction of passing light. Under this condition, the lens assembly 202 of the autostereoscopic display device can project separately two images for the left eye and the right eye, respectively, so as to perceive the 3D image by the viewer. The autostereoscopic display device operates in the 3D mode.

Figure 17:
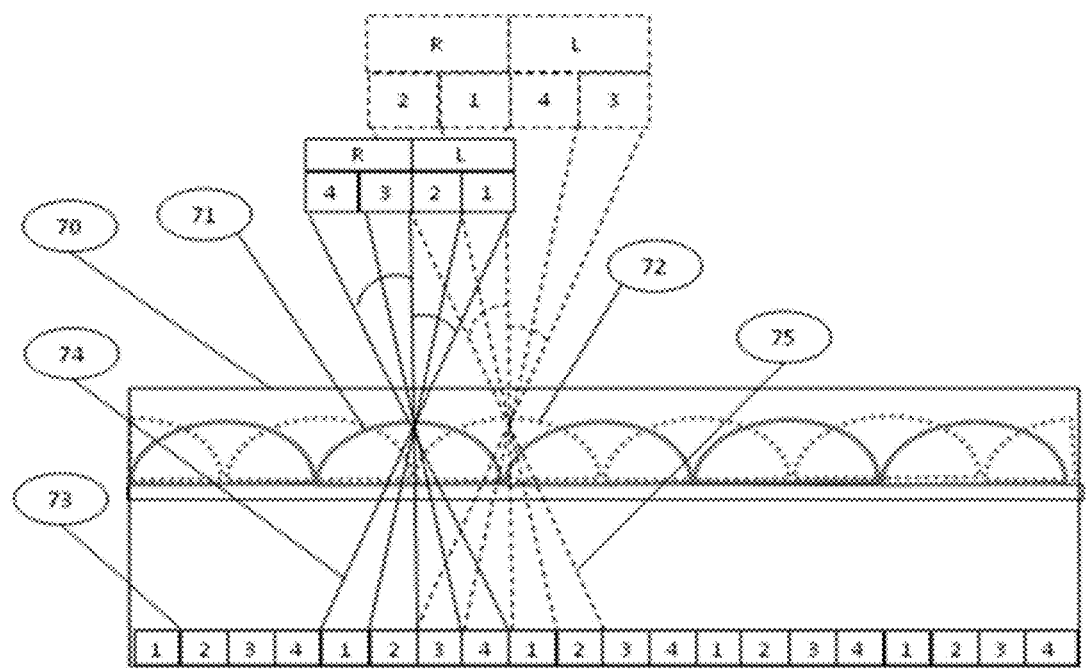
FIG. 17 illustrates exemplary full resolution display of the autostereoscopic display device using a timing drive circuitry consistent with the disclosed embodiments.

FIG. 17 illustrates exemplary full resolution display of the autostereoscopic display device 100 using a timing drive circuitry. As shown in FIG. 17, the first lens assembly 201 and the second lens assembly 202 use liquid crystal and grating materials with different refractive indices (being viewed together with FIG. 16*a* showing the first lens assembly 201 and the second lens assembly 202).

Referring to FIG. 17, display device 100 includes a lens module 70 and a display device 73 having pixels 1, 2, 3, 4, etc., where pixels 1 and 2 represent one image and pixels 3 and 4 represent another image, assuming a single lens cover the 4 pixels. The solid arc line 71 indicates the state at time T1 in FIG. 16*a*, i.e., the lens assembly 201 generates a curved lens effect. Solid line 74 represents optical path of light, which may be refracted and the optical path may change. The viewer's left eye can view pixels 1 and 2, and the right eye can view pixels 3 and 4, i.e., the left eye and the right eye see different images.

Dotted arc line 72 represents the state at time T2 in FIG. 16B, the lens assembly 202 also generates a curved lens effect (T1≠T2). Similarly, dotted line 75 represents the optical path, which may be refracted and the optical path may change. The viewer's left eye can see pixels 3 and 4, and the right eye can see pixels 1 and 2. That is, the viewer can see just opposite images at time T1 and time T2. When the frequency for alternating these two states reaches a certain threshold, due to persistence of vision, the viewer can see tow complete images from both the left eye and the right eye. Thus, a full resolution display can be achieved.

FIG. 18 shows state of the autostereoscopic display device 210*a* at time T1. For simplification purposes, the components 213*a*, 214*a*, 215*a* are together labeled as the first lens assembly 201*a*, and the 213*b*, 214*b*, 215*b*, 216*b* are together labeled as the second lens assembly 201*b*, similar to FIG. 16*a*.

Figure 18A:
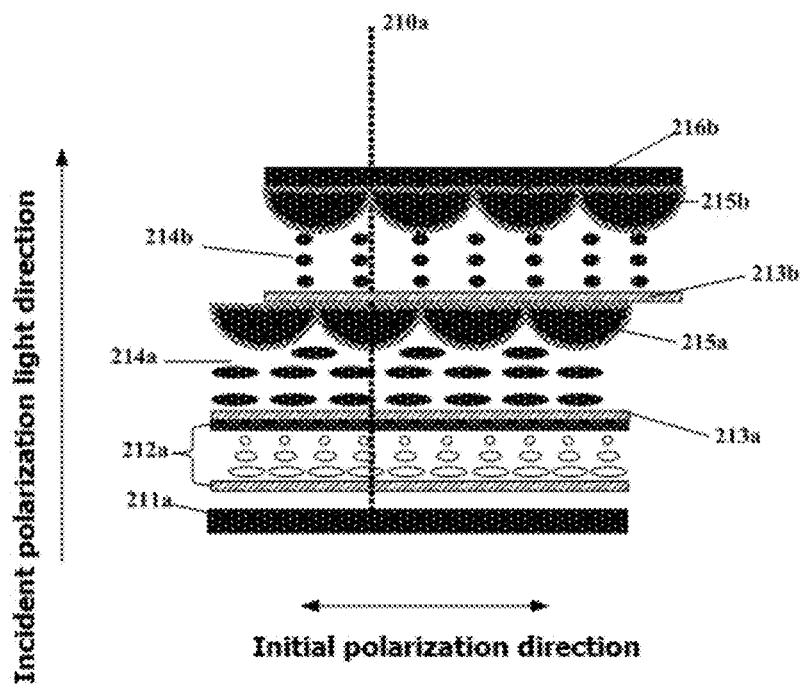
FIGS. 18a-18b illustrate device state when a set of drive voltages applied on a polarization state controller at time T1 and time T2 consistent with the disclosed embodiments.

As shown in FIG. 18*a*, polarized light emits from display panel 211*a* providing an image. The polarization direction of the polarized light is the same as the alignment direction on the surface of the polarization state controller 212*a*. Because the liquid crystal inside the polarization state controller 212*a* can rotate the incident polarized by 90 degrees, the polarization direction of the incident polarized light is rotated by 90 degrees after passing through the first polarization state controller 102*a*, and further reaches the first liquid crystal unit 214*a* (refractive index $n_{o1}/n_{e1}$).

The polarization direction of the polarization state controller 212*a* is perpendicular to the alignment direction of liquid crystal of the first liquid crystal unit 214*a*, with a refractive index of $n_{o1}$. Based on selected material, the first single-refractive-index convex lens 215*a* has a refractive index of $n_{11} = n_{o1}$, i.e., the first single-refractive-index convex lens 215*a* has the same refractive index as the first liquid crystal unit 214*a*. No refraction occurs at the interface of them, and light passes straight through to reach the second liquid crystal unit 214*b*.

Figure 18B:
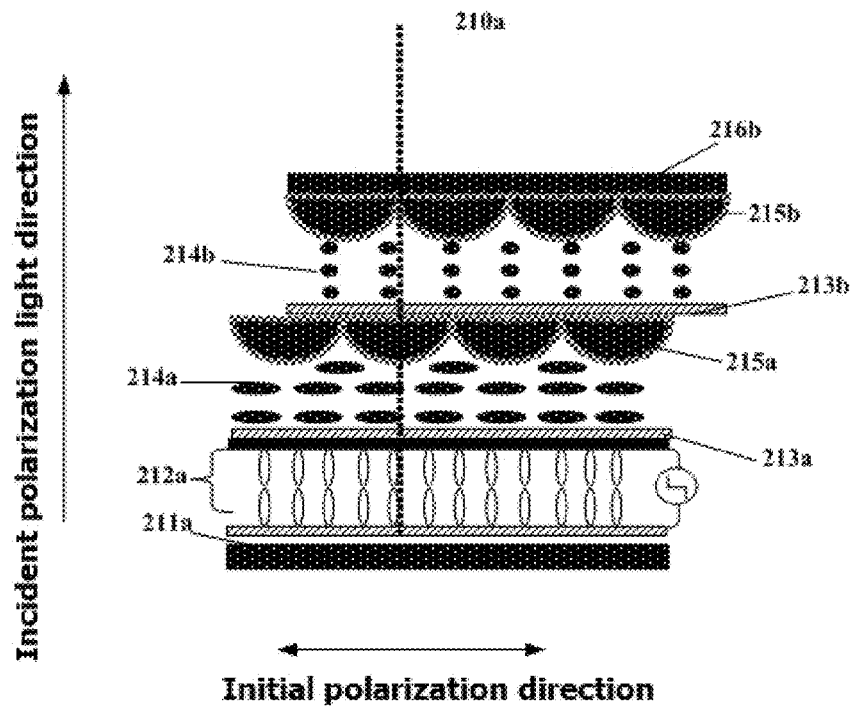

At this time, the polarization direction of the incident polarized light is in parallel to the alignment direction of the second liquid crystal unit 214b. The refractive index of the second liquid crystal unit 214b is $n_{e2}$ and the refractive index of the second single-refractive-index convex lens 215b is $n_{12}=n_{e2}$, i.e., the refractive index of the second single-refractive-index convex lens 215b is greater than the refractive index of the second liquid crystal unit 214b. The combined lens acts as a convex lens and cause refraction of incident light. Under this condition, the lens assembly 201b of the autostereoscopic display device can project separately two images for the left eye and the right eye, respectively, so as to perceive the 3D image by the viewer. The autostereoscopic display device operates in the 3D mode As shown in FIG. 18b, a set of driving voltages are applied on the first polarization state controller 212a, and the alignment direction of the liquid crystal are aligned along the electrical field. The polarized light passes through the first polarization state controller 212a without changing the polarization direction, and reaches the first liquid crystal unit 214a. At this point, the polarization direction of the polarized light is in parallel to the liquid crystal alignment direction of the first liquid crystal unit 214a, and the refractive index of the first liquid crystal unit 214a is $n_{e1}$. Because the refractive index of the first single-refractive-index convex lens 215a is $n_{11}>n_{e1}$, i.e., the refractive index of the first single-refractive-index convex lens 215a is greater than the refractive index of the first liquid crystal unit 214a, the combined lens acts as a convex lens, which causes refraction for passing light.

The polarized light passes through the alignment layer 213b and reaches the second liquid crystal unit 214b (refractive index $n_{o2}/n_{e2}$), and the second single-refractive-index convex lens 215b has a refractive index $n_{12}=n_{o2}$, i.e., the refractive index of the second single-refractive-index convex lens 215b and the refractive index of the second liquid crystal unit 214b are the same. Thus, no refraction occurs at the interface between them, and the light passes straight through the glass substrate 216b. The 3D image effected by the first lens assembly 201a is displayed.

Thus, the first lens assembly 201a and the second lens assembly 201b, respectively, display two images to both the left eye and the right eye at time T1 and T2, respectively. By adjusting the time difference between T1 and T2, a fully resolution 3D display can be achieved.

Figure 19:
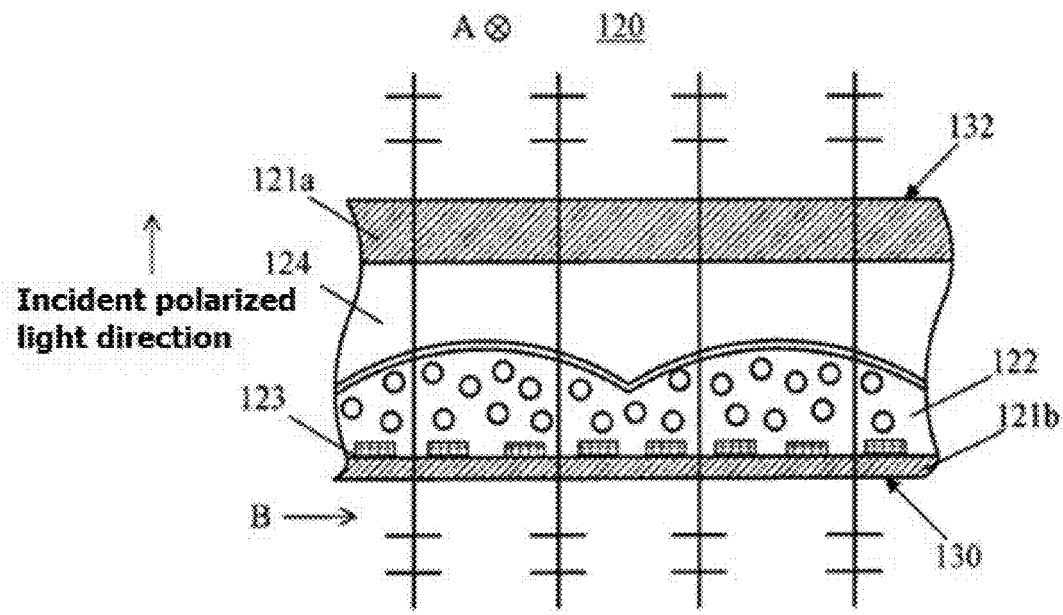
FIG. 19 illustrates a liquid crystal lens assembly and optical path consistent with the disclosed embodiments.

FIG. 19 illustrates a liquid crystal lens assembly 120 and optical path when the alignment direction of liquid crystal molecules within a convex lens 122 is unchanged.

As shown in FIG. 19, the liquid crystal lens assembly 120 includes, sequentially from the emitting surface 132 to the incident surface 130, a transparent glass substrate 121a, a plurality of stripe-shaped concave lenses 124 extending in the first direction A and parallel to one another, and a plurality of stripe-shaped convex lenses 122 extending toward the first direction A and parallel to one another, which corresponding to the concave lenses 124 and coupled together with concave lenses 124.

A liquid crystal convex lens 124 includes a transparent glass substrate 121b, a first electrode layer 123 formed on the transparent glass substrate 121b, and a first liquid crystal layer sandwiched between the concave lens 124 and the transparent glass substrate 121b. Each of the strip-shaped concave lens 124 and liquid crystal convex lens 122 is arranged in the second direction B, where the first direction A and the second direction B are perpendicular to one another.

The transparent glass substrate 121a may be optional, the liquid crystal lens assembly 120 might not require a transparent glass substrate 121a, if the light emitting side of the concave lens 124 can be coated by a protective film.

The electrode layer 123 includes a plurality of elongated parallel control electrodes, and a gap is maintained between two elongated control electrodes. The top of the electrode layer 123 is provided with an alignment film (not shown), the alignment film is used for aligning liquid crystal molecules along a particular direction when an electric field is not applied.

The liquid crystal convex lens 122 is a double-refractive-index convex lens. The first liquid crystal layer of the liquid crystal convex lens 122 has a first ordinary refractive index $n_o$ and a first extraordinary refractive index $n_e$. When the polarization direction of the incident polarized light reaching the lens 122 is perpendicular to the optical axis direction of the liquid crystal molecules, the lens 122 has the first ordinary refractive index $n_o$ with respect to the incident polarized light. On the other hand, when the polarization direction of the incident polarized light reaching the lens 122 is parallel to the optical axis direction of the liquid crystal molecules, the lens 122 has the extraordinary refractive index $n_e$ with respect to the incident polarized light. In certain embodiments, the concave lens 124 has a refractive index n equal to the first ordinary refractive index $n_o$.

As shown in FIG. 19, when no driving voltage is applied on the electrode layer 123 (e.g., between the elongated control electrodes), the alignment direction of the liquid crystal molecules located between the two elongated control electrodes is perpendicular to the paper, due to the action of the alignment film. The polarization direction of the polarized light, after passing through polarizer 115 and reaching the surface 130 of the convex lens 122, is perpendicular to the optical axis of the liquid crystal molecules. Because the refractive index n of concave lens 124 is equal to the first ordinary refractive index $n_o$ of the liquid crystal lens 122, with respect to such polarized light entering the liquid crystal lens 122, no refractive index difference exists between the liquid crystal lens 122 and the concave lens 124, so the polarized light passes straight through. Under this condition, the display device operates in a 2D mode.

Figure 20:
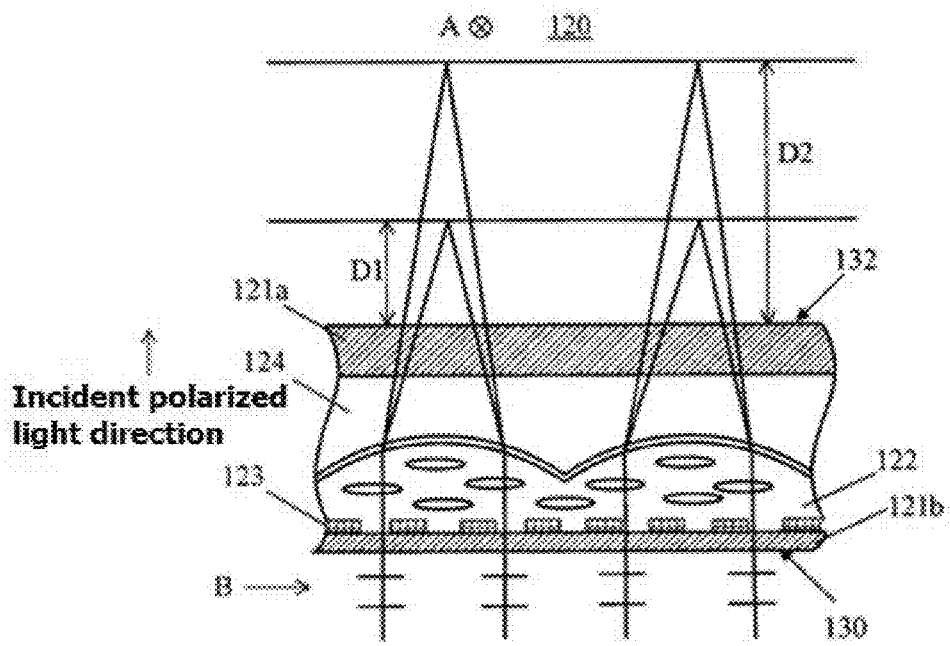
FIG. 20 illustrates a liquid crystal lens assembly and optical path consistent with the disclosed embodiments.

FIG. 20 illustrates the liquid crystal lens assembly 120 and optical path when the alignment direction of liquid crystal molecules within a convex lens 122 is changed.

Referring to FIG. 20, when a driving voltage is applied on the electrode layer 123 (e.g., between two elongated control electrodes), the liquid crystal molecules located between the two elongated control electrodes rotate. The polarization direction of the polarized light emitting from the polarizer 115 has an angle θ with respect to fast axis of the liquid crystal molecules (i.e., in the direction perpendicular to the optical axis), and the liquid crystal lens 122 has the equivalent refractive index $n_{\it{eff}}$. When the driving voltage increases, the angle θ also increases, until the angle θ is 90 degrees, when, for the polarized light, the refractive index of the liquid crystal lens 122 is the first extraordinary refractive index $n_e$. Thus, the equivalent refractive index $n_{\it{eff}}$ when the angle θ is in a range of 0 degree to 90 degrees is corresponding to the equivalent refractive index $n_{\it{eff}}$ when the angle θ is in a range of 90 degrees to 180 degrees. For example, the equivalent refractive index $n_{\it{eff}}$ when the angle θ is at 45 degrees is the same as the equivalent refractive index $n_{\it{eff}}$ when the angle θ is at 135 degrees.

That is, the first ordinary refractive index $n_{o1}$ (the angle θ=0)° and the first extraordinary refractive index $n_{e1}$ (angle 90°) have the largest refractive index difference. Therefore, the equivalent refractive index $n_{eff}$ of the liquid crystal lens 122 is between the first ordinary refractive index $n_o$ and the first extraordinary refractive index $n_e$. Because the equivalent refractive index $n_{eff}$ of the liquid crystal lens 122 is greater than the refractive index n (or $n_o$) of the concave lens 124, the incident polarized light is entering from dense optical medium into sparse optical medium. Thus, the polarized light incident may be refracted on the interface of the liquid crystal lens 122 and the concave lens 124, and the display device operates in a 3D mode.

Figure 21:
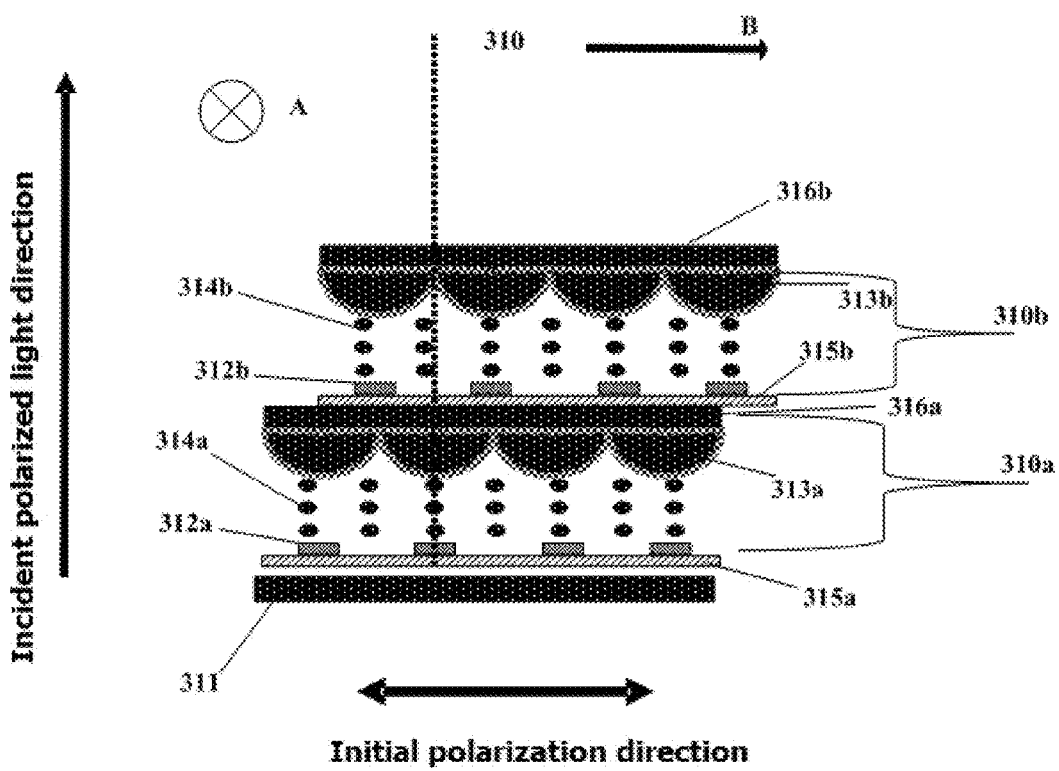
FIG. 21 illustrates optical path of various lens assembly consistent with the disclosed embodiments.

FIG. 21 shows optical path of various lens assembly. As shown in FIG. 21, components 312a, 313a, 314a, 315a, and 316a are labeled together as the first liquid crystal lens assembly 310a, and components 312b, 313b, 314b, 315b, and 316b are labeled as the second liquid crystal lens assembly 310b. The alignment direction of liquid crystal molecules inside the concave lens 314a has not been changed.

The liquid crystal lens assembly 310a includes, sequentially from the emitting surface 311 to the incident surface 315a, a transparent glass substrate 316a, a plurality of stripe-shaped convex lenses 313a extending in the first direction A and parallel to one another, and a plurality of stripe-shaped concave lenses 314a extending toward the first direction A and parallel to one another, which corresponding to the convex lenses 313a and coupled together with convex lenses 313a.

A liquid crystal concave lens 314a includes a transparent glass substrate 315a, an electrode layer 312a formed on the transparent glass substrate 315a, and a first liquid crystal layer sandwiched between the convex lens 313a and the transparent glass substrate 315a. Each of the strip-shaped convex lens 313a and liquid crystal concave lens 314a is arranged in the second direction B, where the first direction A and the second direction B are perpendicular to one another.

The transparent glass substrate 316a may be optional, the liquid crystal lens assembly 310a might not require a transparent glass substrate 316a, if the light emitting side of the convex lens 313a can be coated by a protective film.

The electrode layer 312a includes a plurality of elongated parallel control electrodes, and a gap is maintained between two elongated control electrodes. The top of the electrode layer 312a is provided with an alignment film (not shown), the alignment film is used for aligning liquid crystal molecules along a particular direction when an electric field is not applied.

The liquid crystal concave lens 314a is a double-refractive-index concave lens. The first liquid crystal layer of the liquid crystal concave lens 314a has a first ordinary refractive index $n_{o1}$ and a first extraordinary refractive index $n_{e1}$. When the polarization direction of the incident polarized light reaching the concave lens 314a is perpendicular to the optical axis direction of the liquid crystal molecules, the concave lens 314a has the first ordinary refractive index $n_{o1}$ with respect to the incident polarized light. On the other hand, when the polarization direction of the incident polarized light reading the concave lens 314a is parallel to the optical axis direction of the liquid crystal molecules, the concave lens 314a has the extraordinary refractive index $n_{e1}$ with respect to the incident polarized light. In certain embodiments, the first convex lens 313a has a refractive index n equal to the first ordinary refractive index $n_{o1}$.

As shown in FIG. 21, when no driving voltage is applied on the electrode layer 312a (e.g., between two elongated control electrodes), the alignment direction of the liquid crystal molecules located between the two elongated control electrodes is perpendicular to the paper, due to the action of the alignment film. The polarization direction of the polarized light, after passing through polarizer of the display panel 311 and reaching the surface 315a of the first concave lens 314a, is perpendicular to the optical axis of the liquid crystal molecules. Because the refractive index n of convex lens 313a is equal to the first ordinary refractive index $n_o$ of the first liquid crystal lens 314a, with respect to such polarized light entering the liquid crystal lens 314a, no refractive index difference exists between the liquid crystal lens 314a and the convex lens 313a, so the polarized light passes straight through.

The liquid crystal lens assembly 310b includes, sequentially from the emitting surface 316a to the incident surface 315b, a transparent glass substrate 316b, a plurality of stripe-shaped convex lenses 313b extending in the first direction A and parallel to one another, and a plurality of stripe-shaped concave lenses 314b extending toward the first direction A and parallel to one another, which corresponding to the convex lenses 313b and coupled together with convex lenses 313b.

A liquid crystal concave lens 314b includes a transparent glass substrate 315b, an electrode layer 312b formed on the transparent glass substrate 315b, and a second liquid crystal layer sandwiched between the convex lens 313b and the transparent glass substrate 315b. Each of the strip-shaped convex lens 313b and liquid crystal concave lens 314b is arranged in the second direction B, where the first direction A and the second direction B are perpendicular to one another.

The transparent glass substrate 316b may be optional, the liquid crystal lens assembly 310b might not require a transparent glass substrate 316b, if the light emitting side of the convex lens 313b can be coated by a protective film.

The electrode layer 312b includes a plurality of elongated parallel control electrodes, and a gap is maintained between two elongated control electrodes. The top of the electrode layer 312b is provided with an alignment film (not shown), the alignment film is used for aligning liquid crystal molecules along a particular direction when an electric field is not applied.

The liquid crystal concave lens 314b is a double-refractive-index concave lens. The second liquid crystal layer of the liquid crystal concave lens 314b has a first ordinary refractive index $n_{o2}$ and a first extraordinary refractive index $n_{e2}$. When the polarization direction of the incident polarized light reaching the concave lens 314b is perpendicular to the optical axis direction of the liquid crystal molecules, the concave lens 314b has the first ordinary refractive index $n_{o2}$ with respect to the incident polarized light. On the other hand, when the polarization direction of the incident polarized light reading the concave lens 314b is parallel to the optical axis direction of the liquid crystal molecules, the concave lens 314b has the extraordinary refractive index $n_{e2}$ with respect to the incident polarized light. In certain embodiments, the first convex lens 313b has a refractive index n equal to the first ordinary refractive index $n_{o2}$.

As shown in FIG. 21, when no driving voltage is applied on the electrode layer 312b (e.g., between two elongated control electrodes), the alignment direction of the liquid crystal molecules located between the two elongated control electrodes is perpendicular to the paper, due to the action of the alignment film. The polarization direction of the polarized light, after passing through the transparent glass substrate 316a and reaching the surface 315b of the second concave lens 314b, is perpendicular to the optical axis of the liquid crystal molecules. Because the refractive index n of convex lens 313b is equal to the first ordinary refractive index $n_{o2}$ of the second liquid crystal lens 314b, with respect to such polarized light entering the liquid crystal lens 314b, no refractive index difference exists between the liquid crystal lens 314b and the convex lens 313b, so the polarized light passes straight through. Under this condition, the display device operates in a 2D mode.

Figure 22:
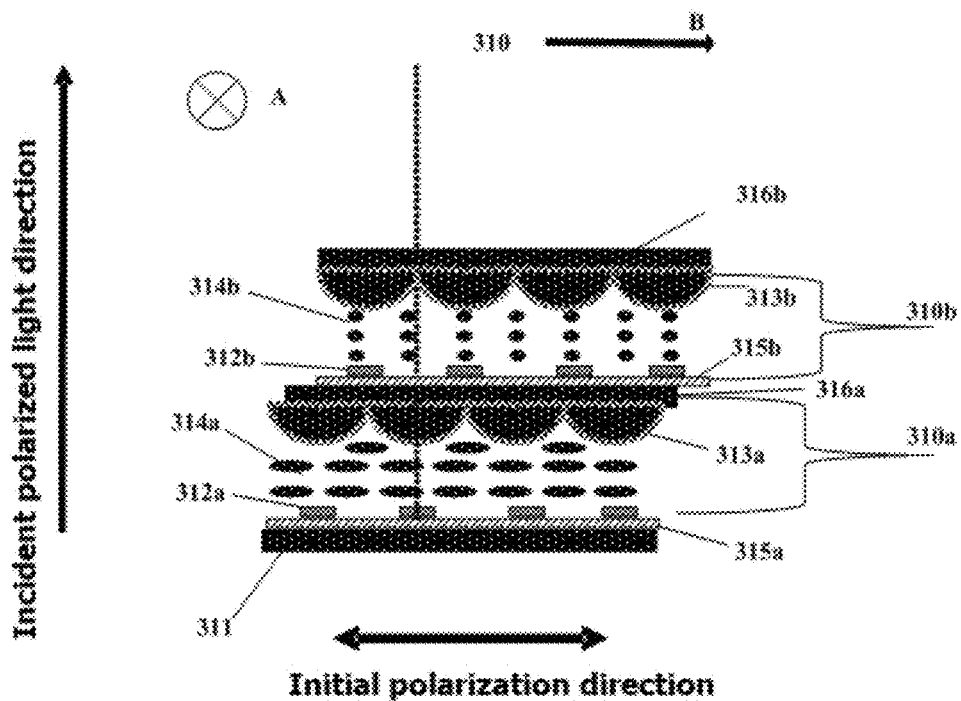
FIG. 22 illustrates optical path of various lens assembly at time T1 consistent with the disclosed embodiments.

FIG. 22 shows optical path of various lens assembly at time T1. As shown in FIG. 22, at time T1, when a driving voltage is applied on the electrode layer 312a (e.g., between two elongated control electrodes), the liquid crystal molecules located between the two elongated control electrodes rotate. The polarization direction of the polarized light emitting from the polarizer of the display panel 311 has an angle θ with respect to fast axis of the liquid crystal molecules (i.e., in the direction perpendicular to the optical axis), while the liquid crystal lens 314a has the equivalent refractive index $n_{eff}$. When the driving voltage increases, the angle θ also increases, until the angle θ is 90 degrees, where, for the polarized light, the refractive index of the liquid crystal lens 314a is the first extraordinary refractive index $n_{e1}$. Thus, the equivalent refractive index $n_{eff}$ when the angle θ is in a range of 0 degree to 90 degrees is corresponding to the equivalent refractive index $n_{eff}$ when the angle θ is in a range of 90 degrees to 180 degrees. For example, the equivalent refractive index $n_{eff}$ when the angle θ is at 45 degrees is the same as the equivalent refractive index $n_{eff}$ when the angle θ is at 135 degrees.

That is, the first ordinary refractive index $n_{o1}$ (the angle θ=0)° and the first extraordinary refractive index $n_{e1}$ (angle 90)° have the largest refractive index difference. Therefore, the equivalent refractive index $n_{eff}$ of the liquid crystal lens 314a is between the first ordinary refractive index $n_{o1}$ and the first extraordinary refractive index $n_{e1}$. Because the equivalent refractive index $n_{eff}$ of the liquid crystal lens 314a is greater than the refractive index n (or $n_{o1}$) of the convex lens 313a, the incident polarized light is entering from dense optical medium into sparse optical medium. Thus, the polarized light incident may be refracted on the interface of the liquid crystal lens 314a and the convex lens 313a.

At this time, the second liquid crystal lens 310b is not changed, the polarization direction of the polarized light, after passing the transparent glass substrate 316a and reaching the incident surface 315b of the second liquid crystal concave lens 314b, is perpendicular to the optical axis of the liquid crystal molecules. Because the refractive index n of the second convex lens 313b is equal to the first ordinary refractive index $n_{o2}$ of the second liquid crystal concave 314b, with respect to the incident polarized light entering the second liquid crystal concave 314b, there is no refractive index difference between the second concave lens 314b and the second liquid crystal convex lens 313b. Therefore, the light will propagate along a straight line emitting from the transparent glass substrate 316b. Therefore, the 3D image effected by the first liquid crystal lens assembly 310a can be viewed by the viewer.

Figure 23:
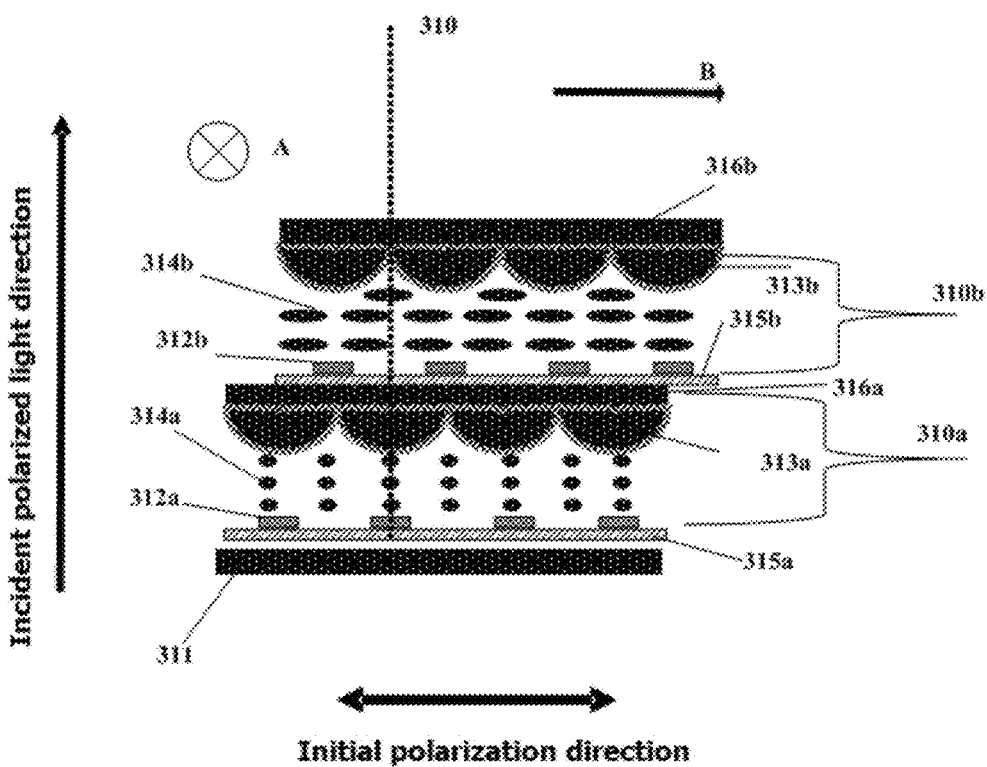
FIG. 23 illustrates optical path of various lens assembly at time T2 consistent with the disclosed embodiments.

FIG. 23 shows optical path of various lens assembly at time T2. As shown in FIG. 23, at time T2, when no driving voltage is applied on the electrode layer 312a (e.g., between two elongated control electrodes) of the first liquid crystal lens 310a, the alignment direction of the liquid crystal molecules located between the two elongated control electrodes is perpendicular to the paper, due to the action of the alignment film. The polarization direction of the polarized light, after passing through the polarizer of the display panel 311 and reaching the surface 315a of the first concave lens 314a, is perpendicular to the optical axis of the liquid crystal molecules. Because the refractive index n of convex lens 313a is equal to the first ordinary refractive index $n_{o1}$ of the first liquid crystal lens 314a, with respect to such polarized light entering the liquid crystal lens 314a, no refractive index difference exists between the liquid crystal lens 314a and the convex lens 313a, so the polarized light passes straight through the transparent glass substrate 316a.

When a driving voltage is applied on the electrode layer 312b (e.g., between two elongated control electrodes), the liquid crystal molecules located between the two elongated control electrodes rotate. The polarization direction of the polarized light emitting from the polarizer of the display panel 311 has an angle θ with respect to fast axis of the liquid crystal molecules (i.e., in the direction perpendicular to the optical axis), while the liquid crystal lens 314b has the equivalent refractive index $n_{eff2}$. When the driving voltage increases, the angle θ also increases, until the angle θ is 90 degrees, where, for the polarized light, the refractive index of the liquid crystal lens 314b is the second extraordinary refractive index $n_{e2}$. Thus, the equivalent refractive index $n_{eff2}$ when the angle θ is in a range of 0 degree to 90 degrees is corresponding to the equivalent refractive index $n_{eff2}$ when the angle θ is in a range of 90 degrees to 180 degrees. For example, the equivalent refractive index $n_{eff2}$ when the angle θ is at 45 degrees is the same as the equivalent refractive index $n_{eff2}$ when the angle θ is at 135 degrees.

That is, the second ordinary refractive index $n_{o2}$ (the angle θ=0)° and the second extraordinary refractive index $n_{e2}$ (angle 90)° have the largest refractive index difference. Therefore, the equivalent refractive index $n_{eff2}$ of the liquid crystal lens 314b is between the second ordinary refractive index $n_{o2}$ and the second extraordinary refractive index $n_{e2}$. Because the equivalent refractive index $n_{eff2}$ of the liquid crystal lens 314b is greater than the refractive index $n_2$ (or $n_{o2}$) of the convex lens 313b, the incident polarized light is entering from dense optical medium into sparse optical medium. Thus, the polarized light incident may be refracted on the interface of the liquid crystal lens 314b and the second convex lens 313b. The 3D image can be produced by the first liquid crystal lens assembly 310b.

By using the disclosed systems and methods, autostereoscopic display can be achieved by using light-splitting devices and polarization state controllers, the backlight efficiency can be greatly improved.

Further, by alternately displaying the odd columns and the even columns of the original parity region image, the combined odd column image and even column image can achieve the full resolution image for 3D image display. Because the alternating speed is higher than the up-limit of the human eye response time, half of the full resolution can be used in a single frame time to display the image of the first time point or the second time point, and the full resolution image can be displayed without any flicker.

The above described embodiments are only for illustrative purposes. It should be noted that those skilled in the art, without departing from the principles of the present disclosure, may make certain improvements and modifications, and these improvements and modifications should also be considered within the scope of the disclosure.

Other applications, advantages, alternations, modifications, or equivalents to the disclosed embodiments are obvious to those skilled in the art.

What is claimed is:

1. A three-dimensional (3D) display system, comprising:
a backlight plate;
a display panel configured to display a two-dimensional (2D) image in a 2D mode or to display a 3D image in a 3D mode;
a light-splitting device coupled to an arrangement module and configured to pass the 2D image in the 2D mode, and to separate the 3D image into a left image and a right image; and
a polarization state controller disposed between the display panel and the light-splitting device and configured to rotate or keep a polarization direction of polarized light emitted from the display panel,
wherein the light-splitting device is a double-layer lens grating including:
a first lens grating; and
a second lens grating,
wherein each of the first lens grating and the second lens grating includes:
a single-refractive-index lens; and
a double-refractive-index lens coupled to the single-refractive-index lens to form a combined lens, wherein:
each of the single-refractive-index lens and double-refractive-index lens has a flat surface and a curve surface, and a curvature radius of the single-refractive-index lens and a curvature radius of the double-refractive-index lens are the same;
an extending direction of the single-refractive-index lens in the first lens grating is parallel to an extending direction of the single-refractive-index lens in the second lens grating, wherein the extending direction of the single-refractive-index lens in the first lens grating is perpendicular to a grating direction of the single-refractive-index lens in the first lens grating, and the extending direction of the single-refractive-index lens in the second lens grating is perpendicular to a grating direction of the single-refractive-index lens in the second lens grating;
when receiving polarized light from the polarization state controller with or without a polarization direction rotation, the combined lens is configured to act as either a convex lens or a flat lens.

2. The display system according to claim 1, where the polarization state controller includes:
a first substrate accepting the emitted light from the display panel;
a second substrate; and
a 90°-twisted nematic liquid crystal layer disposed between the first substrate and the second substrate,
wherein a rubbing direction of an alignment layer on the first substrate of the polarization state controller is same as the polarization direction of the polarized light omitted from the display panel.

3. The display system according to claim 1, wherein:
the single-refractive-index lens is a single-refractive-index convex lens, a refractive index of the single-refractive-index convex lens equal to one refractive index of the double-refractive-index lens and greater than the other refractive index of the double-refractive-index lens; or
the double-refractive-index lens is a double-refractive-index convex lens, a refractive index of the single-refractive-index lens equal to one refractive index of the doable-refractive-index convex lens and greater than the other refractive index of the double-refractive-index convex lens.

4. The display system according to claim 1, wherein:
the double-refractive-index lens has an ordinary refractive index $n_o$ and an extraordinary refractive index $n_e$, and a refractive index of the single-refractive-index lens is equal to the ordinary refractive index $n_o$ and is greater than the extraordinary refractive index $n_e$.

5. The display system according to claim 1, wherein:
the single-refractive-index lens is a single-refractive-index convex lens having a refractive index $n_1$; and
the double-refractive-index lens is a double-refractive-index concave lens having an ordinary refractive index $n_o$, and an extraordinary refractive index $n_e$, and $n_1=n_o$, $n_1>n_e$.

6. The display system according to claim 1, further including:
a light-splitting device driver, a polarization state controller driver, and a display panel driver, wherein:
the light-splitting device driver is configured to switch between 2D display and 3D display;
the polarization state controller driver is configured to provide state switching signals to the polarization state controller, and to receive related signals from the display panel driver to control polarization state switching; and
the display panel driver is configured to control the display panel to display 2D or 3D images, and to sends related signals to the light-splitting device driver and the polarization state controller driver to enable a synchronized operation mode.

7. The display system according to claim 1, wherein:
the polarization state controller and the display panel have a same refreshing rate.

8. The display system according to claim 1, the light-splitting device being the double-layer lens grating, the display system further including a gravity sensing device, wherein:
a first direction and a second direction are defined in the gravity sensing device as two mutually perpendicular display orientations, and the two layers of lens grating are perpendicular to each other and correspond to two directions;
when the gravity sensing device determines the first direction, corresponding display signals are sent to the double-layer lens gratings, such that the double-layer lens gratings can apply voltages on matching electrodes of the corresponding lens grating to achieve 3D display at the first direction; and
when the gravity sensing device determines the second direction, corresponding display signals are sent to the double-layer lens gratings, such that the double-layer lens gratings can apply voltages on matching electrodes of the corresponding lens grating to achieve 3D display at the second direction.

9. The display system according to claim 1, wherein a curvature radius of the first lens grating is larger than a curvature radius of the second lens grating.

10. The display system according to claim 1, wherein:
the flat surface of the double-refractive-index lens receives incident light; and
the curve surface of the single-refractive-index lens faces light incident direction.

11. The display system according to claim 1, wherein:
the single-refractive-index lens and the double-refractive-index lens include a plurality of microlenses, respectively; and
the single-refractive-index lens in the first lens grating and the single-refractive-index lens in the second lens grating are offset by half of a microlens.

12. The display system according to claim 1, wherein:
an optical axis of the double-refractive-index lens in the first lens grating is perpendicular to an optical axis of the double-refractive-index lens in the second lens grating;
the optical axis of the double-refractive-index lens in the first lens grating is perpendicular to the polarization direction of the polarized light emitted from the display panel; and
the optical axis of the double-refractive-index lens in the second lens grating is parallel to the polarization direction of the polarized light emitted from the display panel.

\* \* \* \* \*